United States Patent [19]
Ueda et al.

[11] Patent Number: 6,031,595
[45] Date of Patent: Feb. 29, 2000

[54] AUTOMATIC PROCESSING MACHINE FOR SILVER HALIDE PHOTOGRAPHIC LIGHT-SENSITIVE MATERIAL

[75] Inventors: Yutaka Ueda; Wataru Satake, both of Hino, Japan

[73] Assignee: Konica Corporation, Tokyo, Japan

[21] Appl. No.: 09/062,497

[22] Filed: Apr. 17, 1998

[30] Foreign Application Priority Data

Apr. 25, 1997 [JP] Japan ..................................... 9-108899
May 20, 1997 [JP] Japan ..................................... 9-130157

[51] Int. Cl.[7] ............................ G03B 29/00; G03B 27/32
[52] U.S. Cl. ................................. 355/28; 355/27
[58] Field of Search ................................. 355/27, 28, 29, 355/30; 396/627, 575, 581, 582, 587, 604, 606, 613

[56] References Cited

U.S. PATENT DOCUMENTS 4,745,423  5/1988  Uchida ..................................... 354/320
5,041,864  8/1991  Saito et al. ............................... 355/29
5,698,382  12/1997 Nakahanada et al. .................. 430/418

*Primary Examiner*—Safet Metjahic
*Assistant Examiner*—Hung Henry Nguyen
*Attorney, Agent, or Firm*—Frishauf, Holtz, Goodman, Langer & Chick, P.C.

[57] ABSTRACT

An apparatus for processing a silver halide light sensitive material having an emulsion surface with a processing solution, is provided with a cutter to cut the silver halide light sensitive material into a sheet-shaped silver halide light sensitive material; a heater to heat the sheet-shaped silver halide light sensitive material so as to raise a temperature of the sheet-shaped silver halide light sensitive material to be not lower than 40° C.; and a coater to coat the emulsion surface of the sheet-shaped silver halide light sensitive material with the processing solution.

22 Claims, 14 Drawing Sheets

CUTTING PROCESS

NEXT PROCESS B

FIG. 10 (a)
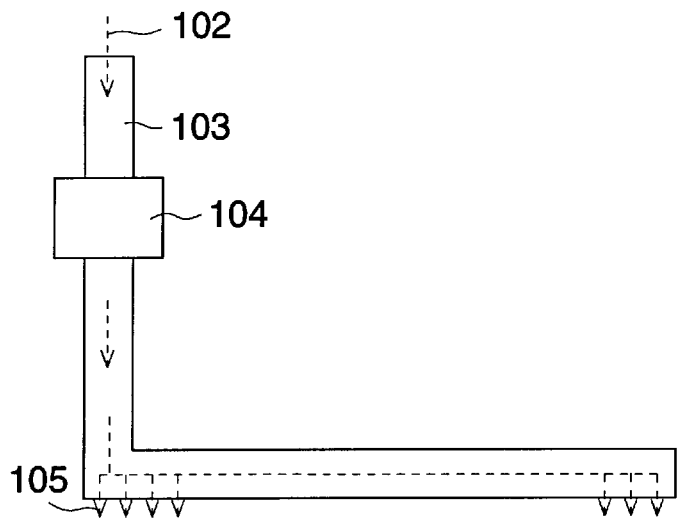
FIG. 10 (c)
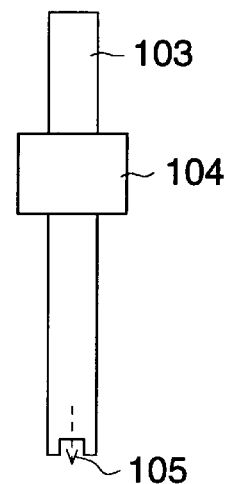
FIG. 10 (b)
FIG. 10 (d)
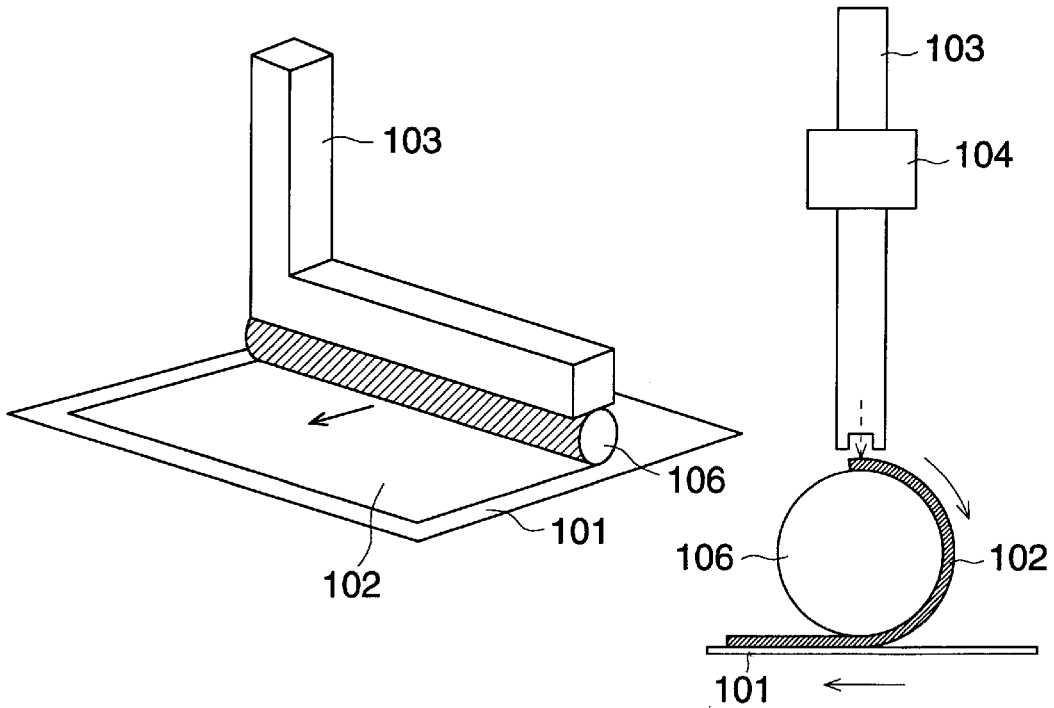
FIG. 10 (e)

FIG. 13 (a)
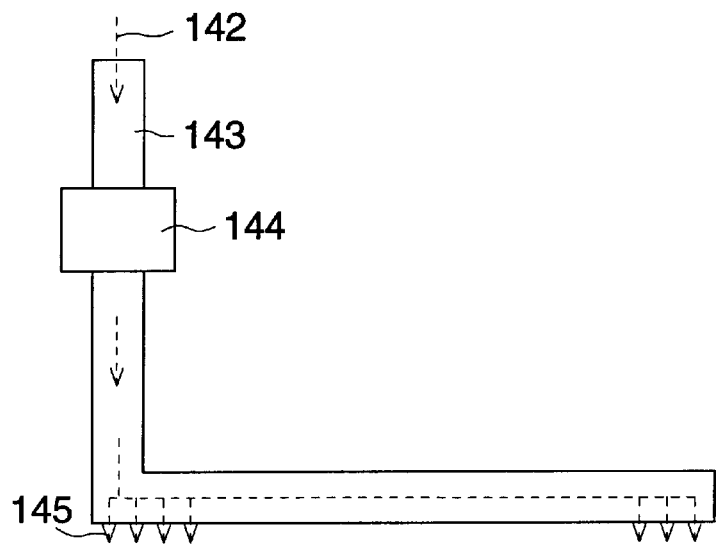
FIG. 13 (c)
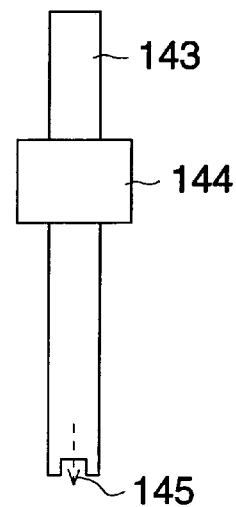
FIG. 13 (b)
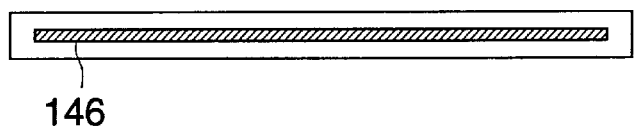
FIG. 13 (d)
FIG. 13 (e)
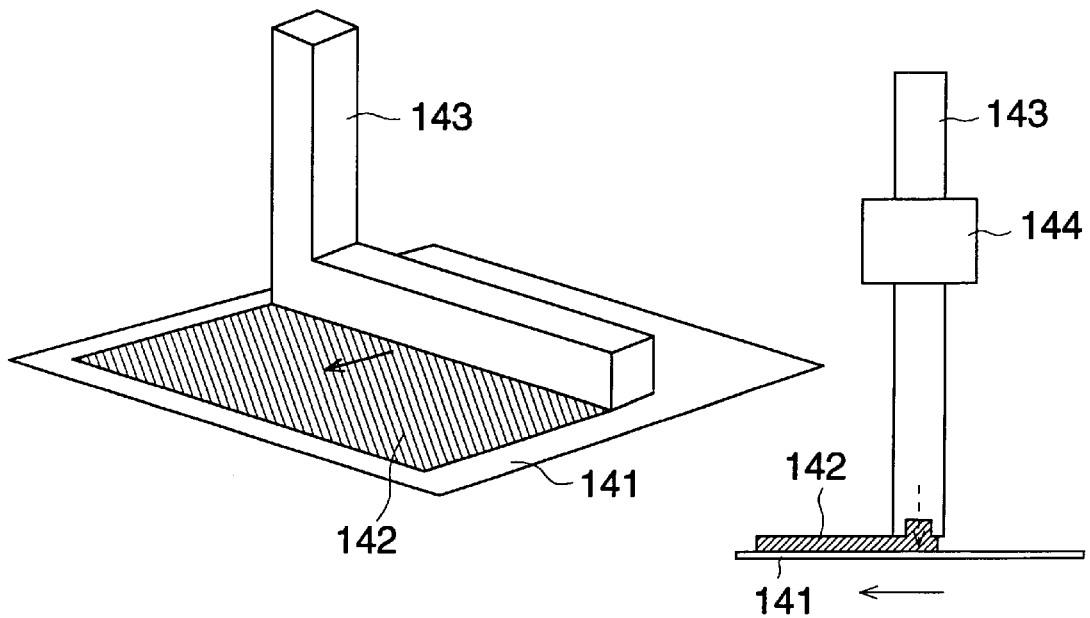

AUTOMATIC PROCESSING MACHINE FOR SILVER HALIDE PHOTOGRAPHIC LIGHT-SENSITIVE MATERIAL

BACKGROUND OF THE INVENTION

The present invention relates to an automatic processing machine for silver halide photographic light-sensitive material which processes a silver halide photographic light-sensitive material (hereinafter, referred also as a light-sensitive material), and more particularly, to an automatic processing machine for silver halide photographic light-sensitive material capable of ultra-rapidly processing, wherein stable photographic processing performance is obtained when varied sizes of silver halide photographic light-sensitive materials are processed.

The market of so-called photo-finishers, where photography is subjected to photographic processing, is becoming more and more diversified year after year. The photo-processing customers are rapidly shifting from the large-scale photo-finishing facilities to mini-labs where photographs are processed in a photography-specializing shop. In addition, it is increasingly common for even drug stores to conduct photographic processing in a corner of the shop. Both of a mini lab and a drug store lab satisfy the needs of customers in that finished papers can be returned on the same day or photographic processing is finished even while a customer is shopping. With this expectation, the demand on rapid processing is increasing.

If photographic processing is conducted in shops other than photography-specializing shops or an office, part-time workers and non-skilled operators, who do not specialize in photography, may use the machine. Therefore, each factor of a dry machine in which the number of processes using a liquid is few and the quantity of a liquid is little, simplification of maintenance, stable processing ability and downsizing of equipment due to the limited installing space becomes very important.

In aforesaid automatic processing machine for a mini-lab, in order to reduce loss of silver halide photographic light-sensitive material, it is common practice for the silver halide photographic light-sensitive material to be subjected to exposure and photographic processing after the silver halide photographic light-sensitive material is cut to a desired size before exposure. In addition, due to diversifying of how to enjoy photography, diversifying of print sizes has also advanced year by year. Therefore, it is a large benefit that various sizes of prints can be processed.

Ordinarily, in photographic processing, during a replenishing step in which a light-sensitive material is automatically dipped in a processing tank, a replenisher is replenished in a processing tank to be overflowed according to information about processing area of the light-sensitive material so that constant status (running condition) is formed. Therefore, the running condition becomes different depending upon the kind of light-sensitive material processed and the volume of processing. Accordingly, the processing liquid must be controlled. Every day, a check piece called as a control stripe is exposed with a standard exposure and developed. The density of the developed check piece is controlled by being compared with the reference value. Depending upon the control condition, it was necessary to discharge all liquids and replace them with new liquids.

In order to avoid the aforesaid complicated and specialized control, various systems in which tanks are not used while only the necessary amount of photographic processing liquids are fed onto the light-sensitive material have been proposed. Japanese Tokkaihei 2-79841 discloses a system to conduct photographic processing in which the processing liquid is impregnated in a sponge. Japanese Tokkaihei 2-79844 discloses a system to feed the processing liquid from a slit-shaped feeding port. Japanese Tokkaihei 9-43814 discloses a system to feed a photographic processor through a gas phase. Japanese Tokkaihei 2-99945 discloses a system to coat the processing liquid by the use of rollers.

The common problem of aforesaid systems is that it is difficult to add fed liquid uniformly into the light-sensitive material. Specifically, if liquid feeding is conducted in a small amount in order to reduce carry-over of developer into the next step or reduce effluent amount, to add fed liquid uniformly onto the light-sensitive material becomes rather difficult.

In order to shorten the processing time, the aforesaid coating unevenness becomes further prominent. In order to minimize coating unevenness, technologies of air blowing (see Japanese Tokkaihei 2-79846) and liquid diffusion by the use of a member such as sponge (see Japanese Tokkaihei 2-91645) are disclosed. However, in both cases, splashing of liquid and oxidation of the developer in the porous member occurs, causing serious problems when put into practical use. Therefore, solutions have been desired.

In order to minimize loss of a photographic paper, the mainstream of a recent mini lab machine is a cut conveyance type in which, after a photographic paper is cut prior to a printing step, aforesaid cut paper is conveyed to the printing step and a photographic processing step. Accordingly, the occurrence of coating unevenness of a processing liquid at the end of the cut paper results in a critical problem.

SUMMARY OF THE INVENTION

The present invention has been attained considering the above-mentioned situation. A first objective of the present invention is to provide an automatic processing machine for silver halide photographic light-sensitive material which can process various sizes of silver halide photographic light-sensitive material stably without unevenness and rapidly in which processing control has been improved, in processing the silver halide photographic light-sensitive material. A second objective of the present invention is to provide an automatic processing machine for silver halide photographic light-sensitive material which can stably process the light-sensitive material even when the amount of processing is low. A third objective is to provide an automatic processing machine for silver halide photographic light-sensitive material in which processing speed is rapid, amount of effluent is low and environmental load is also low.

In order to solve the above-mentioned problems and attain the above-mentioned objectives, the present invention is constituted as follows:

1. An automatic processing machine for silver halide photographic light-sensitive material which processes silver halide photographic light-sensitive material by feeding it a processing liquid, wherein a cutting step which cuts the above-mentioned silver halide photographic light-sensitive material prior to processing aforesaid silver halide photographic light-sensitive material, a heating means which heats aforesaid silver halide photographic light-sensitive material to 40° C. or higher and a coating step which coats the processing liquid onto the emulsion surface of the above-mentioned silver halide photographic light-sensitive material are provided. A system in which a light-sensitive material is cut prior to processing, aforesaid light-sensitive material is heated to 40° C. or higher and necessary amount of a processing liquid is fed onto the silver halide photographic light-sensitive material after that was adopted. Due to this, since processing tanks are removed and a new liquid is always fed, troublesome processing control is not necessary at all. In addition, due to causing the fed amount of the processing liquid extremely minute, the amount of effluent is reduced and an environment-friendly system can be provided.

2. The automatic processing machine for silver halide photographic light-sensitive material described in item 1, wherein the above-mentioned cutting step is located prior to imagewise exposure. Due to a system in which a silver halide photographic light-sensitive material is cut a desired size prior to exposure, effects of the present invention becomes more clear.

3. The automatic processing machine for silver halide photographic light-sensitive material described in either item 1 or 2, wherein the above-mentioned silver halide photographic light-sensitive material substantially linearly under a flat status during coating operation in the above-mentioned coating step by means of a coating means. Due to aforesaid coating means, the processing liquid is coated uniformly on the emulsion surface of the silver halide photographic light-sensitive material and thereby the silver halide photographic light-sensitive material can be securely conveyed.

4. The automatic processing machine for silver halide photographic light-sensitive material described in either item 1 through 3, wherein the silver halide photographic light-sensitive material passes within 10 seconds after coating operation of the above-mentioned coating means. After coating operation, the silver halide photographic light-sensitive material passes between rollers within 10 seconds. Therefore, the processing liquid coated on the emulsion surface of the silver halide photographic light-sensitive material is caused to be uniform and excessive portion can be removed.

5. The automatic processing machine for silver halide photographic light-sensitive material described in item 4, wherein the above-mentioned rollers are squeezing rollers. After aforesaid coating operation, the silver halide photographic light-sensitive material passes between rollers within 10 seconds. Therefore, the processing liquid coated on the emulsion surface of the silver halide photographic light-sensitive material is caused to be uniform and any excessive amount of processing liquid can be removed.

6. The automatic processing machine for silver halide photographic light-sensitive material described in either item 1 or 4, wherein the above-mentioned coating step is a color developing step. Due to applying the present invention to aforesaid color developing step, a first processing step, uniform and sure coating is achieved and superiority over the other methods becomes more clear.

7. The automatic processing machine for silver halide photographic light-sensitive material described in item 6, wherein the above-mentioned color developing step is composed of two or more coating steps. Due to providing two or more coating steps, aptitude for rapid processing and aptitude for stable processing can be kept.

8. The automatic processing machine for silver halide photographic light-sensitive material described in item 7, wherein the above-mentioned color photographic processing step has at least a step which coats a part liquid containing at least a color developing agent and a step which coats a part liquid containing an alkaline component. Due to providing two or more coating steps, aptitude for rapid processing and aptitude for stable processing can be kept.

9. The automatic processing machine for silver halide photographic light-sensitive material described in either item 1 through 8, wherein the above-mentioned color photographic processing step has at least a step which coats a part liquid containing at least a color developing agent and, after that, a step which coats a part liquid containing an alkaline component.

10. The automatic processing machine for silver halide photographic light-sensitive material described in any of items 1 through 9, wherein the above-mentioned retention mechanism retaining the above-mentioned silver halide photographic light-sensitive material. Due to a retention mechanism, a silver halide photographic light-sensitive material can be retained surely. Thereby, coating of the processing liquid becomes further uniform and conveyance property of the silver halide photographic light-sensitive material is improved.

11. An automatic processing machine for silver halide photographic light-sensitive material which conducts photographic processing by feeding a processing liquid onto a silver halide photographic light-sensitive material, wherein a conveyance means which conveys aforesaid silver halide photographic light-sensitive material is provided, a means for feeding and coating the processing liquid onto the emulsion surface of aforesaid silver halide photographic light-sensitive material is provided, a means for sensing aforesaid silver halide photographic light-sensitive material is provided in the conveyance path on the upstream side compared with a step having feeding and coating aforesaid processing liquid and a means for controlling starting the operation of means for feeding and coating aforesaid processing liquid is provided on the upstream side of a step having a means for feeding and coating the above-mentioned processing liquid onto aforesaid silver halide photographic light-sensitive material.

Due to that a means for sensing aforesaid silver halide photographic light-sensitive material is provided in the conveyance path on the upstream side compared with a step having feeding and coating aforesaid processing liquid and a means for controlling starting the operation of means for feeding and coating aforesaid processing liquid is provided on the upstream side of a step having a means for feeding and coating the above-mentioned processing liquid onto aforesaid silver halide photographic light-sensitive material, feeding and coating the processing liquid is possible at the leading end of a photographic paper in which a photographic paper is processed.

Accordingly, due to the present invention, a silver halide photographic light-sensitive material can be used efficiently and stable processing performance can be attained wherein no development unevenness occurs.

12. The automatic processing machine for silver halide photographic light-sensitive material described in item 11 having a heating means which heats aforesaid silver halide photographic light-sensitive material in a step having a means for feeding and coating the above-mentioned processing liquid in such a manner that the surface temperature of the emulsion of aforesaid silver halide photographic light-sensitive material when the processing liquid is fed and coated onto the above-mentioned silver halide photographic light-sensitive material is 40° C. or more and 90° C. or less.

Due to heating aforesaid silver halide photographic light-sensitive material in a step having a means for feeding and coating the above-mentioned processing liquid in such a manner that the surface temperature of the emulsion of aforesaid silver halide photographic light-sensitive material when the processing liquid is fed and coated onto the above-mentioned silver halide photographic light-sensitive material is 40° C. or more and 90° C. or less, In addition, rapid processability can be provided.

13. The automatic processing machine for silver halide photographic light-sensitive material described in item 11 or 12, wherein a step having a means for feeding and coating the above-mentioned processing liquid is either a color developing step or a black-and-white developing step.

Processing stability and unevenness prevention are specifically critical in a color developing step and a black-and-white developing step. The effects of the present invention can be specifically provided for a color developing step and a black-and-white developing step.

14. The automatic processing machine for silver halide photographic light-sensitive material described in item 13, wherein a step having a means for feeding and coating the above-mentioned processing liquid is a color developing step.

Specifically, if a light-sensitive material processed is a silver halide color photographic light-sensitive material, emulsion layers coloring takes a multi-layered structure. In the color developing step, the above-mentioned reduction in terms of processing stability and the occurrence of unevenness in terms of color developing tend to occur. Therefore, effects of the present invention can specifically be provided in a color developing step.

15. The automatic processing machine for silver halide photographic light-sensitive material described in item 14, wherein the time for the above-mentioned color developing step is 20 sec. or less.

If the time for the above-mentioned color developing step is 20 sec. or less, it is preferable that stable processing performance can be provided without causing reduction of development reaction due to evaporation of the processing liquid fed and coated. The preferable color developing time in terms of maintaining stable processing performance of the present invention is 5–20 sec., and the more preferable time is 10–15 sec.

16. The automatic processing machine for silver halide photographic light-sensitive material described in any of either item 11 through 15, wherein a means for sensing the above-mentioned silver halide photographic light-sensitive material in the conveyance path on the upstream compared with a step having a means for feeding and coating the above-mentioned processing liquid and a means for controlling a heating means which heats the above-mentioned silver halide photographic light-sensitive material in such a manner that the surface temperature of the emulsion of aforesaid silver halide photographic light-sensitive material when the processing liquid is fed and coated onto the above-mentioned silver halide photographic light-sensitive material is 40° C. or more and 90° C. or less when the heating means which heats the silver halide photographic light-sensitive material starts operation when the processing liquid is fed and coated onto aforesaid silver halide photographic light-sensitive material due to a signal from aforesaid sensing means and aforesaid silver halide photographic light-sensitive material enters a step having a feeding and coating the processing liquid.

Due to having a means for sensing a silver halide photographic light-sensitive material upstream in the conveyance path on the compared with a step having a feeding and coating the processing liquid and the surface temperature of the emulsion of aforesaid silver halide photographic light-sensitive material when the processing liquid is fed and coated onto the above-mentioned silver halide photographic light-sensitive material is 40° C. or more and 90° C. or less when the heating means which heats the silver halide photographic light-sensitive material starts operation when the processing liquid is fed and coated onto aforesaid silver halide photographic light-sensitive material due to a signal from aforesaid sensing means and aforesaid silver halide photographic light-sensitive material enters a step having a feeding and coating the processing liquid, unnecessary heating can be prevented, adverse effect onto the exposure section on a photographic paper due to heating can be prevented and crystal coagulation due to evaporation of processing liquid drop adhered on the conveyance path of the photographic paper can be reduced.

Due to setting the surface temperature of the emulsion of light-sensitive material to 40° C. or more and 90° C. or less, reduction of development reaction due to evaporation of the processing liquid fed and coated can be prevented. In addition, stable processing performance can be provided in a relatively short time. It is preferable to control the surface temperature of the emulsion surface of the light-sensitive material to 45° C. or more and 70° C. or less.

17. The automatic processing machine for silver halide photographic light-sensitive material described in item 11 through 16 having a means for setting the amount of processing liquid fed onto the silver halide photographic light-sensitive materially means of a means for feeding and coating the above-mentioned processing liquid during a step having a means for feeding and coating the above-mentioned processing liquid to 5 ml or more and 100 ml or less per $m^2$ of aforesaid silver halide photographic light-sensitive material.

By controlling the amount of processing liquid fed onto the silver halide photographic light-sensitive material by means of a means for feeding and coating the above-mentioned processing liquid during a step having a means for feeding and coating the above-mentioned processing liquid to 5 ml or more and 100 ml or less per $m^2$ of aforesaid silver halide photographic light-sensitive material, the processing liquid fed and coated to 40° C. or more and 90° C. or less. In addition, processing stability can be maintained. In addition, the amount of processing liquid used can be reduced. Further, contamination on the processing liquid feeding and coating section can be prevented. The amount of processing liquid is preferably 10 ml or more and 80 ml or less per $m^2$.

18. The automatic processing machine for silver halide photographic light-sensitive material described in any of either item 11 through 17, wherein the above-mentioned means for feeding and coating the processing liquid has at least one porous processing liquid feeding section or a slit-shaped processing liquid feeding section located approximately perpendicular to the conveyance direction of the above-mentioned silver halide photographic light-sensitive material and aforesaid 1'processing liquid is fed and coated onto the surface of the emulsion surface of the silver halide photographic light-sensitive material.

Due to the invention related to this item, stable processing performance without unevenness and also rapid processing performance can be maintained.

With regard to feeding of the processing liquid from aforesaid above-mentioned porous processing liquid feeding section or aforesaid slit-shaped processing liquid feeding section, a replenisher pump may be operated or a storage tank which stores the processing liquid above aforesaid processing liquid feeding section is provided. Utilizing the weight of aforesaid processing liquid, communication path between the processing liquid storage tank and the processing liquid feeding section can be closed/opened.

Inside or outside the above-mentioned porous processing liquid feeding section or a slit-shaped processing liquid feeding section, cloth, sponge or felt member are provided which swells the processing liquid. Aforesaid swelling member may be coated by contacting the emulsion surface of the light-sensitive material.

19. The automatic processing machine for silver halide photographic light-sensitive material described in any of items 11 through 18, wherein the above-mentioned processing liquid feeding and coating means has at least one porous processing liquid feeding section or a slit-shaped processing liquid feeding section located approximately perpendicular to the conveyance direction of the above-mentioned silver halide photographic light-sensitive material, and at least one roller which rotates against the processing liquid fed from aforesaid processing liquid feeding section, and aforesaid rotation roller is brought into contact with the emulsion surface of silver halide photographic light-sensitive material.

Due to the invention related to this item, stable processing performance without unevenness and rapid processing performance can be maintained.

With regard to feeding of the processing liquid from the above-mentioned porous processing liquid feeding section or the slit-shaped processing liquid feeding section, a replenisher pump may be operated or a storage tank which stores the processing liquid above aforesaid processing liquid feeding section is provided. Utilizing the weight of aforesaid processing liquid, communication path between the processing liquid storage tank and the processing liquid feeding section can be closed/opened.

Inside or outside the above-mentioned porous processing liquid feeding section or a slit-shaped processing liquid feeding section, cloth, sponge or felt member are provided which swells the processing liquid. Aforesaid swelled member may be coated by contacting the emulsion surface of the light-sensitive material.

20. The automatic processing machine for silver halide photographic light-sensitive material described in either item 11 through 19, wherein the above-mentioned processing liquid feeding and coating means has at least one pair of rollers, a trough container which dips aforesaid rollers in the above-mentioned processing liquid and the surface of the roller immersed in the above-mentioned processing liquid is brought into contact with the emulsion surface of aforesaid silver halide photographic light-sensitive material for feeding and coating of the processing liquid.

Due to the invention related to this item, stable processing performance without unevenness and also rapid processing performance can be maintained in the case of photographic paper of various paper width size.

BRIEF DESCRIPTION OF THE DRAWINGS

FIGS. 10(a) to 10(e) are drawings showing one example (a processing liquid is fed by a rotation roller) of a medium contact type processing liquid feeding means.

FIGS. 13(a) to 13(e) are drawings showing still another example (the processing liquid is fed in a slit shaped processing liquid feeding section) of a contact-type processing liquid feeding means in which liquid is caused to contact.

DETAILED DESCRIPTION OF THE PREFERRED EMBODIMENT

Figure 1:
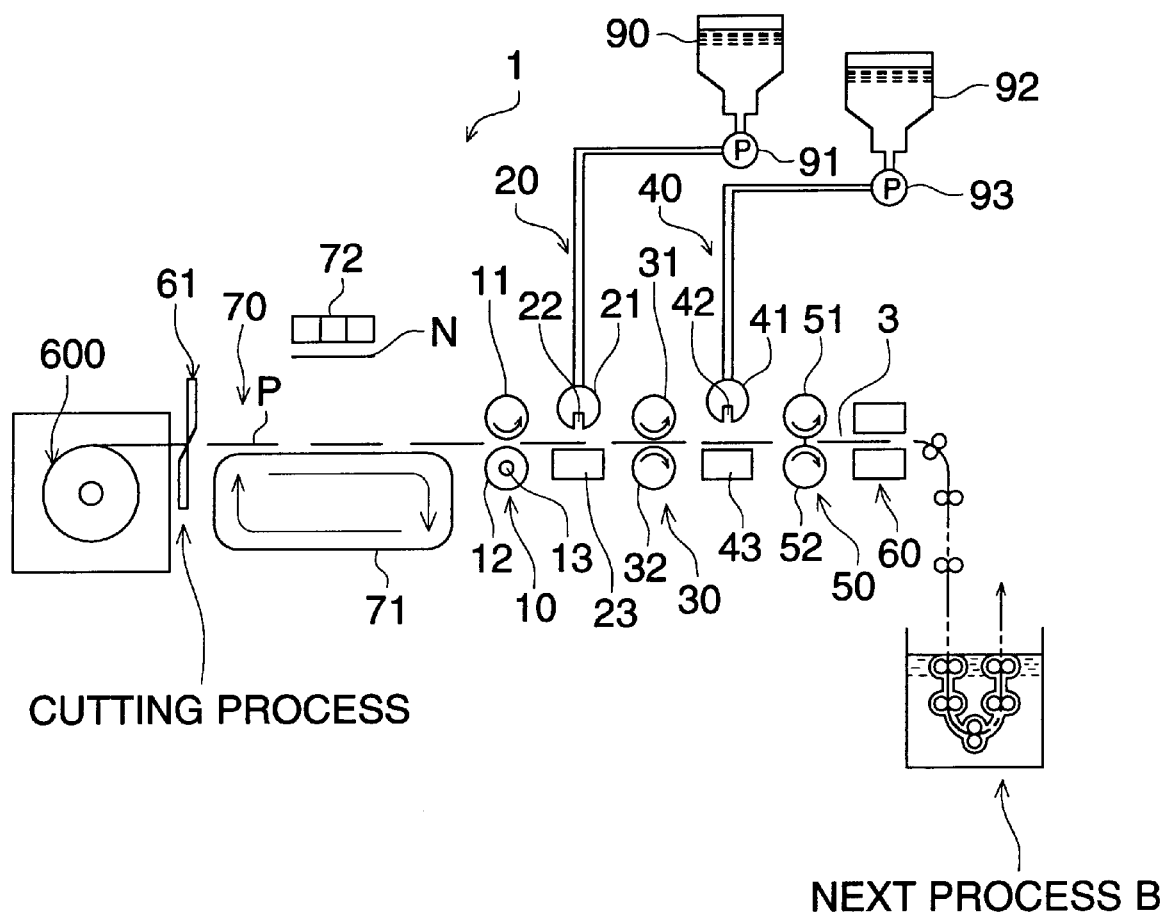
FIG. 1 shows a schematic block diagram of a horizontal automatic processing machine for silver halide photographic light-sensitive material.

Hereinafter, constitution of the present invention will be detailed.

[Silver Halide Photographic Light-Sensitive Material]

Examples of a silver halide photographic light-sensitive material processed in an automatic processing machine for silver halide photographic light-sensitive material of the present invention include a color photographic light-sensitive material containing a silver chloride emulsion, a silver halide monochrome light-sensitive material, a silver halide color photographic light-sensitive material containing a silver bromoiodide emulsion or a silver bromide emulsion and a silver halide monochrome light-sensitive material.

As a silver halide photographic light-sensitive material processed in an automatic processing machine for silver halide photographic light-sensitive material of the present invention, a photographic paper type in which silver chloride ratio is 80 mol % or more is preferred, from the viewpoint of rapidity too. It is further preferable to have at least one emulsion layer containing a silver halide emulsion in which 90 mol % or more of silver halide component is composed of silver chloride. Additionally, the content of silver chloride in the silver halide emulsion is preferably 95–100 mol %, and more preferably 98–100 mol %, from the viewpoint of processability.

[Automatic Processing Machine for Silver Halide Photographic Light-sensitive Material]

In the present invention, the automatic processing machine for silver halide photographic light-sensitive material has a cutting step in which a silver halide photographic light-sensitive material is cut to a desired size of exposure, prior to processing. More preferably, the machine cuts the paper prior to exposure. In aforesaid cutting step, a sharpened metal member (a cutter) is pressed on the light-sensitive material for cutting. Cutting may be directed from either upper surface or a lower surface of the light-sensitive material. Cutting size data is sent by means of a signal for exposure size so that a prescribed length is fed from a paper magazine for cutting.

[Coating Means]

In the present invention, a coating means is defined to coat and supply a certain amount of a processing liquid onto the emulsion surface of a silver halide photographic light-sensitive material. Not included is a method to immerse the light-sensitive material into a tank in which the processing liquid is filled so that photographic gradient is caused to invade into the light-sensitive material due to diffusion from a bulk liquid nor a method to feed the processing liquid through a gas phase.

Practically, a method to coat the processing liquid by means of a member such as a roller and a method to feed the processing liquid directly such as a curtain coating method. In a member contact type and a direct liquid feeding type, an air doctor coater, a blade coater, a rod coater, a knife coater, a squeeze coater, an immersion coater, a reverse roller coater, a transfer roller coater, a curtain coater, a double roller coater, a slide hopper coater, a graveure coater, a kiss roll coater, a bead coater, a casting coater, a spray coater, a calendar coater and an extrusion coater are cited. In terms of the effects of the present invention, the specifically preferable types cited are the squeeze coater, the graveure coater, the immersion coater, the bead coater and the blade coater.

[Coating Step]

During the coating step, it is preferable that the silver halide photographic light-sensitive material moves flatly and linearly. However, it is allowed that linearity in terms of the conveyance direction is sacrificed due to pressing a coating roller or a liquid feeding nozzle onto the surface of the light-sensitive material. Conveyance direction after coating is not specifically limited. In addition, if the conveyance direction is linear, horizontal direction, vertical direction and intermediate direction thereof are allowed.

In terms of the effects of the present invention, the preferable embodiment is that the light-sensitive material passes between the squeeze rollers within 10 seconds after coating and more preferably within 5 seconds. In order to feed the processing liquid uniformly onto the surface of the light-sensitive material, which is one of the objectives of the present invention, a preferable result can be obtained by being passed between aforesaid squeeze roller within a certain time.

In the present invention, it is preferable that the coating step has a mechanism to retain the light-sensitive material. As a retention mechanism, a means using rollers and a means in which a guide is provided are cited.

[Color Developing Step]

In the present invention, a color developing step is referred to since the first processing liquid for color developing is fed to the light-sensitive material until the processing liquid in the succeeding step (for example, a bleach-fixer, a bleacher or a stopper) is fed or the light-sensitive material is immersed in the processing liquid in the succeeding step.

In the color developing step, which is the first processing step, the light-sensitive material is conveyed to the coating step while it is completely dry. Therefore, the light-sensitive material is easy to receive the influence by curling. Specifically, since the influence on the center portion of the roll type light-sensitive material is large, the difference of the present invention and other inventions becomes prominent.

In the present invention, from the viewpoint of securing aptitude for rapid processing and that for stable processing, it is preferable that a color developing step is composed of two or more coating steps. More preferably, at least one step is a step in which a part of the liquid whose main component is a color developing agent and the other one step is a step in which a part liquid whose main component is an alkaline agent. Specifically more preferably, the part liquid whose main component is a color developing agent is coated prior to the part liquid whose main component is an alkaline agent.

[Heating Means]

In the present invention, it is necessary to heat the light-sensitive material to 40° C. or higher, specifically 50° C. or higher is preferable. From the viewpoint of heat durability of the light-sensitive material and controllability for processing, 100° C. or lower is preferably, and 95° C. or lower is more preferable and 90° C. or lower is specifically more preferable in order to prevent boiling of the processing liquid.

As a heating means, a transmission heating means in which a heat drum or a heat belt contacts the light-sensitive material for transmitting heat, a convection heating means due to convection of hot air from a drier and an irradiation heating means due to irradiation of infrared beam or high frequency electromagnetic wave. The time of heating may either be prior to coating, during coating or after coating. Combination thereof may be allowed.

In the case of a transmission heating means, in order to prevent adverse affects onto the emulsion surface of the light-sensitive material processed, it is preferable that a heat source contacts the light-sensitive material processed from the rear side.

In the present invention, when the light-sensitive material is heated before the processing liquid is fed onto the emulsion surface of the light-sensitive material, in order to minimize the difference of sensitivity due to the temperature of the light-sensitive material when exposure, it is preferable to heat the light-sensitive material after exposure is completed too.

To provide a heating control means which controls in such a manner that a heating means heats the light-sensitive material when the silver halide photographic light-sensitive material exists at a point where the heating means heats is preferable since unnecessary heating can be prevented. The present invention is attained by having a conveyance means which conveys the silver halide photographic light-sensitive material at a prescribed conveyance speed and a light-sensitive material sensing means which senses the existence of the silver halide photographic light-sensitive material at a prescribed position on the upstream side in the conveyance direction compared with a position where the heating means heats, wherein the heating control means conducts controlling based on the sensing of the light-sensitive material sensing means. It is preferable to control the heating by the heating means since a prescribed time passed after the sensing of the existence of the silver halide photographic light-sensitive material from non-existence at a prescribed position by the light-sensitive material sensing means until a prescribed time passed after the sensing of the non-existence of the silver halide photographic light-sensitive material from existence at a prescribed position by the light-sensitive material sensing means.

"To feed and coat a processing liquid" in the present invention refers to either of feeding the processing liquid while it is spread out into a thin layer on the surface of the emulsion under a condition that a member which feeds the processing liquid directly contacts the surface of the emulsion of the light-sensitive material, feeding the processing liquid while it is spread out into a thin layer on the surface of the emulsion under the condition that the processing liquid fed from the member which feeds the processing liquid is brought into contact with the surface of the emulsion of the light-sensitive material processed or feeding the processing liquid by spraying the processing liquid onto the surface of the emulsion of the light-sensitive material from the feeding section which feeds the processing liquid through space.

In addition, the thickness of "thin layer" spread out on the surface of the emulsion of the light-sensitive material processed is referred as 2–300 $\mu$m and more preferably 5–100 $\mu$m.

The ratio of the time for feeding the processing liquid from the processing liquid feeding means to the time of the color developing step is 70% or less, preferably 30% or less and more preferably 15% or less.

"Time for feeding the processing liquid" is the time when a processing liquid in the relevant step is fed onto a point on the surface of the emulsion of the light-sensitive material. For example, if the processing liquid feeding means is a medium contact type, it refers to the contact time when a roller or a sponge at one point on the light-sensitive material (for example, since the edge of the light-sensitive material starts to contact with a roller or a sponge until the edge of the light-sensitive material stops to contact with aforesaid roller or sponge).

From the viewpoint of rapidity, the time for feeding the processing liquid is preferably 5 seconds or less, more preferably 3 seconds or less and specifically more preferably 2 seconds or less.

In order to prevent reduction of processing efficiency, conveyance speed is preferably 5 mm/sec. or more and more preferably 10 mm/sec. or more. In addition, from the viewpoint of processing stability, conveyance speed is preferably 500 mm/sec. or less, more preferably 200 mm/sec. or less and specifically more preferably 100 mm/sec. or less.

In the present invention, as a sensing means which senses the silver halide photographic light-sensitive material in the conveyance path prior to a step having a means for feeding and coating the processing liquid, an infrared beam sensor, a ultrasonic sensor or a micro-switch can be used in order to prevent light fogging on the light-sensitive material being processed.

Here, a sensing means, which senses a light-sensitive material, used for starting an operation to feed and coat the processing liquid before the silver halide photographic light-sensitive material is conveyed to a step having a processing liquid coating means and a sensing means, which senses a light-sensitive material, used for starting an operation by a heating means which heats the silver halide photographic light-sensitive material when the processing liquid is coated and fed onto the silver halide photographic light-sensitive material may be the same or different.

In the present invention, it is preferable that the heating means for the surface of the emulsion of the light-sensitive material starts heating operation on the upstream side compared with the processing liquid feeding and coating step in such a manner that the temperature on the surface of the light-sensitive material is heated to aforesaid 40–90° C. before the light-sensitive material enters into aforesaid processing liquid feeding and coating step.

In the present invention, it is preferable that a sensing means which senses whether or not there is a light-sensitive material in the light-sensitive material conveyance path after the above-mentioned processing liquid feeding and coating step, that aforesaid sensing means confirms that the light-sensitive material on which the processing liquid was coated and fed has passed and that, when the sensing means confirms that the next light-sensitive material does not passes within a prescribed time after the previous light-sensitive material has passed, use of excessive processing liquid can be prevented by stopping the operation of the above-mentioned processing liquid feeding means.

In addition, in the present invention, it is preferable that a sensing means which senses whether or not there is a light-sensitive material in the light-sensitive material conveyance path after the above-mentioned processing liquid feeding and coating step, that aforesaid sensing means confirms that the light-sensitive material on which the processing liquid is coated and fed has passed and that, when the sensing means confirms that the next light-sensitive material has not passed within a prescribed time after the previous light-sensitive material has passed, excessive heating can be prevented by stopping the operation of the heating means which maintains the temperature of the surface of the emulsion of the light-sensitive material at 40–90° C.

The above-mentioned light-sensitive material sensing means necessary for determining operation stop timing of the processing liquid feeding means and the above-mentioned light-sensitive material sensing means necessary for determining operation stop timing of the heating means which maintains the temperature of the surface of the emulsion of the light-sensitive material at 40–90° C. may be the same as the light-sensitive material sensing means provided in the conveyance path before a step having a means for feeding and coating the processing liquid for determining start timing of the processing liquid feeding means and start timing of the operation of the means for heating the surface of the emulsion of the light-sensitive material.

Generally, "after a prescribed time after the last light-sensitive material has passed" depends upon conveyance speed of the light-sensitive material conveyed. In the present invention, in the case of "after a prescribed time after the last light-sensitive material has passed" when stopping the operation of the means for feeding and coating the processing liquid, it is preferably 0.5–60 sec. after the last light-sensitive material has passed. In the case of "after a prescribed time after the last light-sensitive material has passed" when stopping the operation of the means for heating the light-sensitive material, it is preferably 1–180 sec. after the last light-sensitive material has passed.

In the present invention, it is preferable to has a structure in which, below the processing liquid feeding and coating section, a trough to receive excessive processing liquid fed and coated so that the processing liquid stored in the trough flows into an effluent tank.

If the present invention is applied to a color developing step or a developing step, from the viewpoint of obtaining uniform wettability and uniformly feeding the processing liquid, the surface tension of the developer is preferably 15 dyne/cm or more and 45 dyne/cm or less, and more preferably 20 dyne/cm or more and 35 dyne/cm or less. In order to regulate the surface tension, it is preferable to incorporate fluorine-containing agents disclosed in Japanese Tokkaihei 7-92634 or a nonion type activators such as an ethyleneoxide type or a glycidol type or silicone type activators disclosed in Japanese Tokkaihei 4-299340.

In the present invention, the developer can be separate to a liquid containing a color developing agent or a developing agent and a liquid containing alkaline for feeding separately. "Developing starter" when two kinds of liquids are used as a developer is defined to be a processing liquid containing a color developing agent or a developing agent. It is an aqueous solution in which a surfactant, a solubilizing agent of a color developing agent and a preserver are contained (hereinafter, referred to as a color developing agent solution or a developing agent solution). Developing activator liquid is a processing liquid in which alkaline is the main component. It is an aqueous solution containing a surfactant, a solubilizing agent of a color developing agent, a preserver and a chelating agent (hereinafter, referred to also as an alkaline solution).

As a color developing agent used for a developing starter, para-phenylenediamine-containing compounds are preferable. As a para-phenylenediamine-containing compound, compounds having a water-soluble group are preferable. As a para-phenylenediamine-containing compound having a water-soluble group, those having at least one water-soluble group on an amino group of a para-phenylenediamine-containing compound or on a benzene nuclei are cited. As practical illustrated compounds of para-phenylenediamine-containing compounds preferably used in the present invention, (C-1) through (C-16) described in Japanese Tokkaihei 4-86741, on pp. 7–9 and (1) through (26) described in Japanese Tokkaihei 3-246543, on pp. 6–10. The above-mentioned color developing agents are ordinarily used in a form of hydrochlorate, sulfate and p-toluenesulfonate.

As a solubilizing agent of a color developing agent, triethanolamine, polyethylene glycols and para-toluenesulfonic acid described in Tokuganhei 7-10769. Added amount is 1 g or more and 100 g or less per 1 liter, preferably 5 g or more and 80 g or less and specifically preferably 10 g or more and 50 g or less. As a preserver, sodium sulfite and hydroxylamines described in Tokkaihei 8-29924 are cited.

A developing agent used for the developing starter preferably include phenidone, 4-hydroxymethyl-4-methyl-1-phenyl-3-pyrazolidone, methol, ascorbic acid and hydroquinone.

An alkaline agent used for the developing activator liquid is a compound exhibiting alkaline properties in which pH is 8.0 or more when 7.0 g of an alkaline agent is dissolved in 1 liter of pure water. As preferable practical examples, alkaline metal compounds such as sodium carbonate, potassium carbonate, sodium bicarbonate, potassium bicarbonate, trisodium phosphate, tripotassium phosphate, disodium phosphate, dipotassium phosphate, sodium borate, potassium borate, sodium tetraborate, potassium tetraborate, sodium hydroxide, potassium hydroxide and lithium hydroxide are cited. Of these, sodium carbonate, potassium carbonate, sodium bicarbonate and potassium bicarbonate are preferable.

In the case of a two-liquid processing in which a liquid containing a color developing agent and a liquid containing alkaline, fed amount of each liquid is preferably 2 ml or more and preferably 5 ml or more per $m^2$ of light-sensitive material. In addition, it is preferably 90 ml or less, more preferably 40 ml or less and specifically more preferably 30 ml or less per $m^2$ of light-sensitive material.

From the viewpoint of obtaining effects which are the objectives of the present invention, timing in which the developing activator liquid is fed onto the surface of the light-sensitive material is preferably within 5 seconds and more preferably 0.1 sec. or more and 2 sec. or less after feeding the developing starter.

Since feeding of the color developing liquid onto the silver halide photographic light-sensitive material enables reduction of the amount of effluent, it is preferable to proportionalize the fed amount of the processing liquid to exposure amount onto the light-sensitive material.

From the viewpoint of rapidity of processing and stability, the processing liquid is preferably dense. In the present invention, liquid renewal ratio is extremely high. Therefore, specifically when the processing liquid feeding means is a medium contact type and a non-contact type, only the necessary amount of processing liquid is fed onto the emulsion surface of the light-sensitive material. Therefore, even if a dense liquid is used, it is extremely unlikely that deterioration of the color developing agent, changing to tar, crystal coagulation due to evaporation and contamination become problematic.

Practically, in the case of a developer, the added amount of a color developing agent is preferably 10 g or more and more preferably 20 g or more per 1 liter, from the viewpoint of obtaining effects which are objectives of the present invention.

The form of the light-sensitive material may either be a web type, a web type after being cut to a prescribed size or a sheet type. The web type after being cut to a prescribed size or a sheet type are preferable since light-sensitive material lose is small when a problem occurs. Specifically, if the web type after being cut to a prescribed size is used, it is preferable to cut the light-sensitive material prior to exposure and subject the cut paper to exposure and photographic processing.

In the present invention, it is preferable that the storage section of the processing liquid for color developing to be fed and coated is tightly closed in order to minimize liquid deterioration due to air oxidation. Here, "the storage section of the processing liquid" represents a processing liquid storage tank which communicates with inside of the feeding section at which the processing liquid is fed and coated and/or the feeding and coating section and capable of feeding the processing liquid to the feeding and coating section.

As a method for replenishing the processing liquid fed and coated, a method to directly replenish the processing liquid for replenishing to the inside of the above-mentioned processing liquid feeding and coating section and/or a processing liquid storage tank, a method to replenish a solid processing agent for replenishing and dissolution water which dissolves a solid processing agent to the above-mentioned processing liquid storage tank and a method in which a tank for dissolving a solid processing agent for replenishing is provided, the solid processing agent for replenishing and its dissolution water are supplied to the tank for dissolution and, after the solid processing agent is finished dissolution, dissolved solution is moved to the inside of the above-mentioned processing liquid feeding and coating section and/or the processing liquid storage tank may be considered to be adopted. From the viewpoint of lightening of the processing agent for replenishing and handling property by an operator, the method to supply the solid processing agent for replenishing is preferable.

Hereinafter, an embodiment of the automatic processing machine for silver halide photographic light-sensitive material of the present invention will be detailed referring to drawings. In this embodiment, explanation is given for a developing step. However, the present invention will be applied to the other processing steps such as a fixing step and a washing step too.

FIG. 1 shows a schematic block diagram of a horizontal type automatic processing machine for silver halide photographic light-sensitive material has a cutting step A prior to processing silver halide photographic light-sensitive material P. In cutting step A, roll magazine 600 on which silver halide photographic light-sensitive material P is rolled is set, where silver halide photographic light-sensitive material P is fed from magazine 600 and cut by cutter 61. A sheet-shaped silver halide photographic light-sensitive material P cut is sent to exposure section 70. In exposure section 70, conveyance belt 71 is provided. On photographic paper constituting silver halide photographic light-sensitive material P set on conveyance belt 71, an image in negative film N is exposed.

Exposed silver halide photographic light-sensitive material P is sent to developing step 1. In aforesaid developing step 1, conveyance path 3, which is provided horizontally, which conveys silver halide photographic light-sensitive material P is formed. Silver halide photographic light-sensitive material P, cut prior to be conveyed to developing step 1, is a sheet-shaped. It is conveyed while the image-formed surface faces upward. In conveyance path 3 which conveys silver halide photographic light-sensitive material P, pre-heating section 10, first coating section 20, first squeezing section 30, second coating section 40, second squeezing section 50 and heating section 60 are located in the direction of conveying light-sensitive material, which is sent to the next step B through heating section 60.

Pre-heating section 10 provides a heating means which heats the silver halide photographic light-sensitive material to 40° C. or higher. In pre-heating section 10, conveyance roller 11 is located above conveyance path 3. Facing aforesaid conveyance roller 11, below conveyance path 3, heating roller 12 is located. Heater 13 is built in heat roller 12. Silver halide photographic light-sensitive material P is heated to 40–95° C., preferably 50–90° C., by means of heat roller 12 so that developing is accelerated.

A part liquid containing a color developing agent is fed and coated from first coating section 20 located upstream in the direction of conveying light-sensitive material by means of pump 91 from replenishing tank 90. The coated processing liquid is squeezed in first squeezing section 30 to be uniform. Another part liquid containing an alkaline agent is fed and coated from second coating section 40 located upstream in the direction of conveying light-sensitive material by means of pump 91 from replenishing tank 92. The coated processing liquid is squeezed in second squeezing section 50 to be uniform. Due to this, heat is provided onto the light-sensitive material by means of heating section 60 for photographic processing.

The automatic processing machine for silver halide photographic light-sensitive material has a coating step in which a processing liquid is coated onto the emulsion surface of silver halide photographic light-sensitive material P. On first coating section 20 and second coating section 40 in aforesaid coating step, liquid feeding nozzles 21 and 41 which constitute a coating means are provided. On liquid feeding nozzles 21 and 41, liquid emission ports 22 and 42 are formed in the lateral direction of silver halide photographic light-sensitive material P. On first coating section 20 and second coating section 40, retention mechanisms 23 and 43 which retain silver halide photographic light-sensitive material P are provided. Aforesaid retention mechanisms 23 and 43 are constituted by pressure troughs. Due to these pressure troughs, silver halide photographic light-sensitive material P can surely be retained, thereby further uniform coating of the processing liquid and improved conveyance properties of silver halide photographic light-sensitive material P are realized.

In first and second squeezing sections 30 and 50, respectively, squeezing rollers 31 and 51 are provided above to contact the image forming surface of silver halide photographic light-sensitive material P. In such occasions, the lower side of silver halide photographic light-sensitive material P is constituted of conveyance rollers 32 and 52. Aforesaid squeezing rollers 31 and 51 respectively uniformly squeeze the developer fed onto silver halide photographic light-sensitive material P.

Ordinarily, as a squeezing roller, a water-absorptive sponge roller is used. In the present invention, rollers having a less water-absorptive property such as metal rollers including SUS, plastic rollers, rubber rollers, fabricated rollers, non-fabricated rollers and incinated rollers are preferable. Practically, as metal rollers, stainless steel rollers (SUS316L, SUS316, SUS304 and SUS303), aluminum (Al) rollers, titanium (Ti) rollers and brass (Bs) are preferable. In addition, as materials of squeezing rollers, polyethyleneterephthalate (PBT), polyethylene (PE), tetrafluoride ethylene perfluoro alkoxyethylene copolymer resin (PFA), polyacetal (POM), polypropylene (PP), polytetrafluoride ethylene (PTFE), polyvinyl chloride (PVC), phenol resin (PF), denatured polyphenyleneether (PPE), denatured polyphenyleneoxide (PPO), polyurethane (PU), polycarbonate (PC), polyphenylenesulfide (PPS), polyfluoride vinylidene (PVDF), tetrafluoride ethylene hexafluoride propylene copolymer resin (FEP) and tetrafluoride ethylene ethylene copolymer resin (ETFE) are preferable. As rubber rollers, ethylene propylene rubber (EPDM, EPM), silicone rubber (Si), nitrile rubber (NBR) and chloroplene rubber (CR) are preferable. As materials for the fabricated rollers and non-fabricated rollers, polyorefine-containing fiber, polyester-containing fiber, polyacrilonitrile-containing fibers, aliphatic group polyamide-containing fibers, aromatic group polyamide-containing fibers and polyphenylene sulfide-containing fibers are preferable. In addition, rollers coated with Teflon are specifically preferable.

In the coating step, conveyance direction of coating operation is preferably silver halide photographic light-sensitive material P moves linearly under flat status. Provided tat, however, the conveyance direction may be horizontal to the ground, vertical or oblique as shown in FIG. 3.

Figure 2:
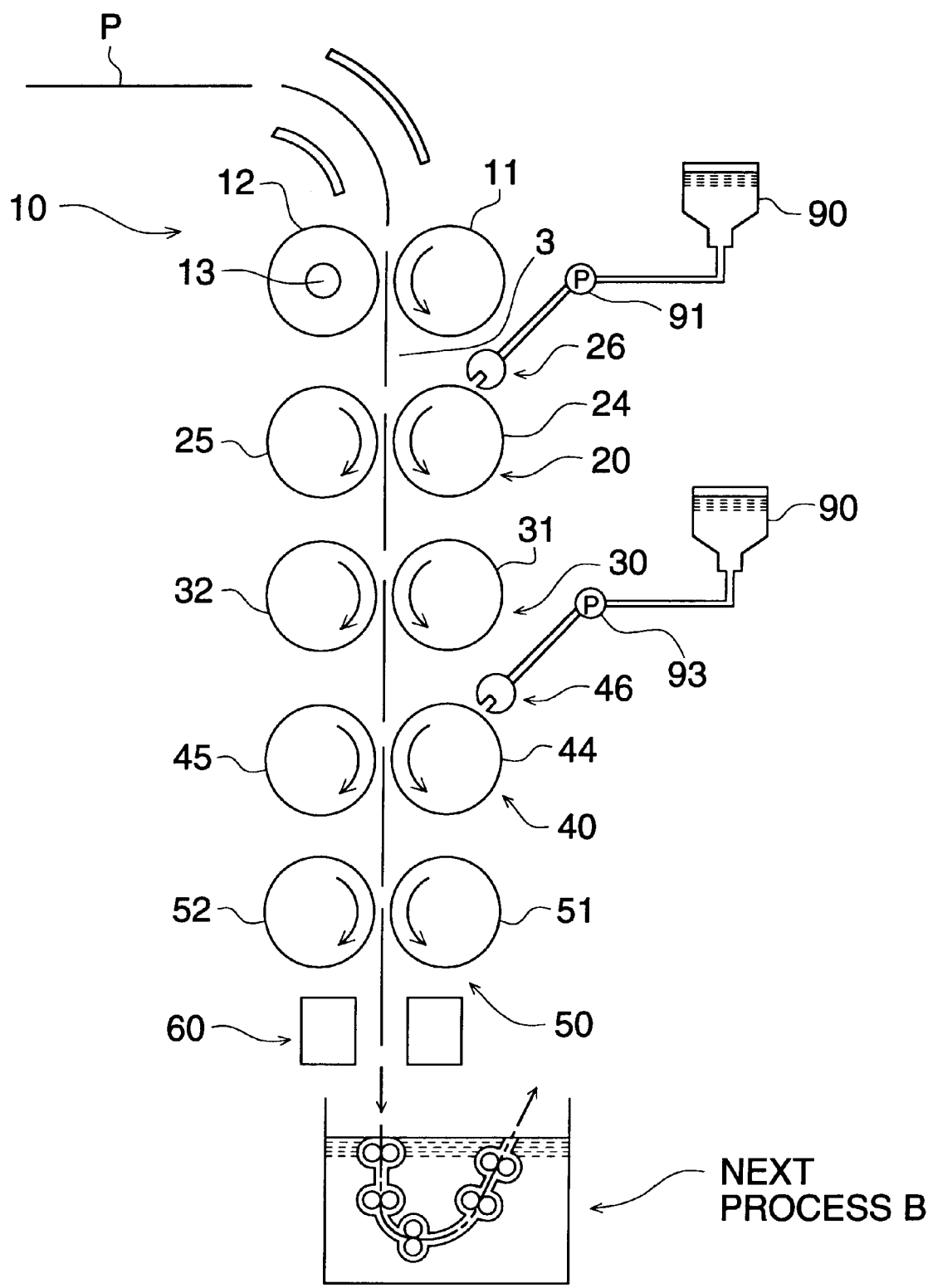
FIG. 2 shows a schematic block diagram of a vertical type automatic processing machine for silver halide photographic light-sensitive material.

FIG. 2 shows a schematic block diagram of a vertical type automatic processing machine for silver halide photographic light-sensitive material. In this embodiment, conveyance path 3 which conveys silver halide photographic light-sensitive material P is formed vertical, in which pre-heating section 10, first coating section 20, first squeezing section 30, second coating section 40, second squeezing section 50 and heating section 60 are located in this order in the direction of conveying the light-sensitive material, which is conveyed to the next step B through heating section 60.

In first coating section 20, paired coating rollers 24 and 25 are located. In second coating section 40, paired coating rollers 44 and 45 are located. Due to actuation by pumps 91 and 93, a processing liquid from replenishing tanks 90 and 92 is fed from above paired coating rollers by means of processing liquid feeding means 26 and 46, and is pooled between paired coating rollers 24 and 25 and paired coating rollers 44 and 45. Silver halide photographic light-sensitive material P is conveyed downward. When silver halide photographic light-sensitive material P passes between paired coating rollers 24 and 25 and paired coating rollers 44 and 45, the processing liquid is coated onto the silver halide photographic light-sensitive material P.

Figure 3:
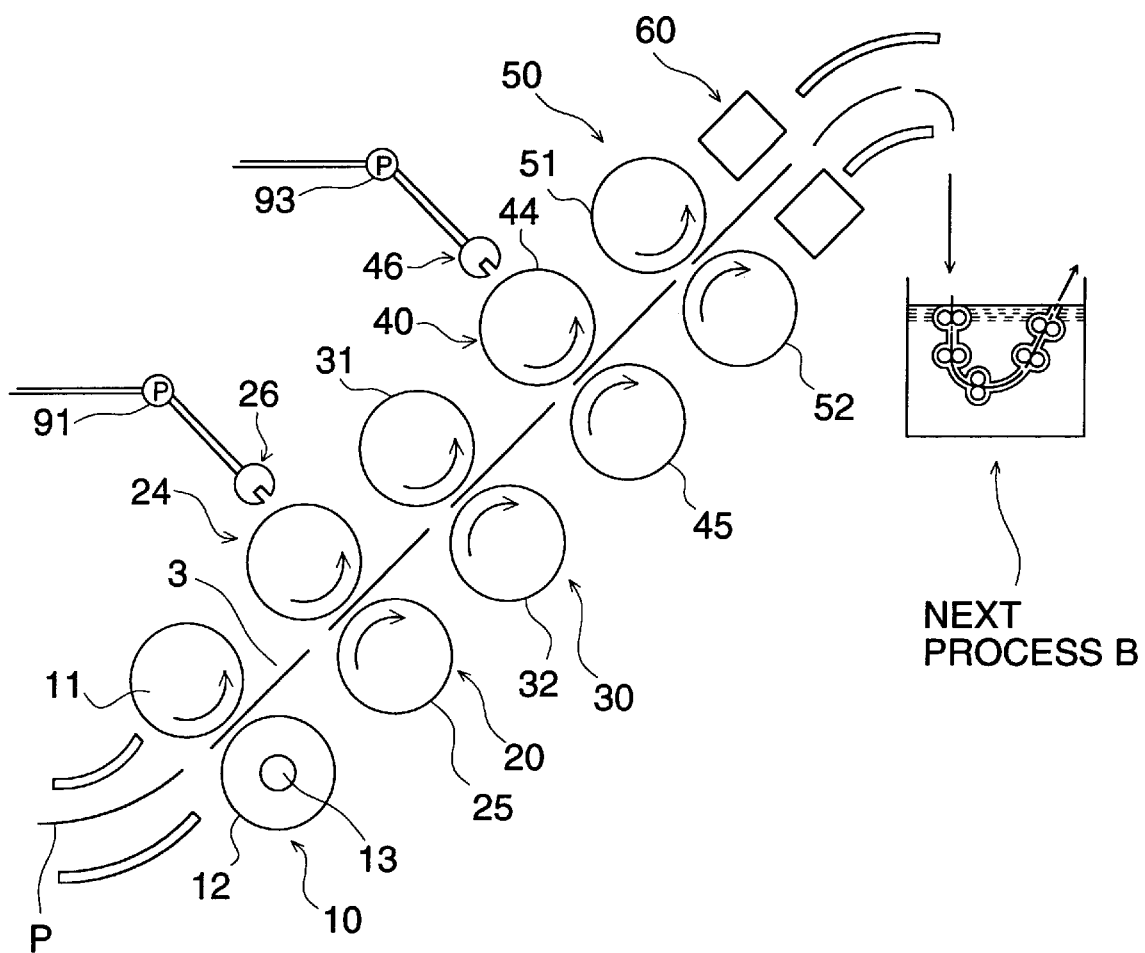
FIG. 3 shows a schematic block diagram of an oblique type automatic processing machine for silver halide photographic light-sensitive material.

FIG. 3 shows a schematic block diagram of an oblique type automatic processing machine for silver halide photographic light-sensitive material. In this embodiment, conveyance path 3 which conveys silver halide photographic light-sensitive material P is formed obliquely, in which pre-heating section 10, first coating section 20, first squeezing section 30, second coating section 40, second squeezing section 50 and heating section 60 are located in this order in the direction of conveying the light-sensitive material, which is conveyed to the next step B through heating section 60.

Figure 4:
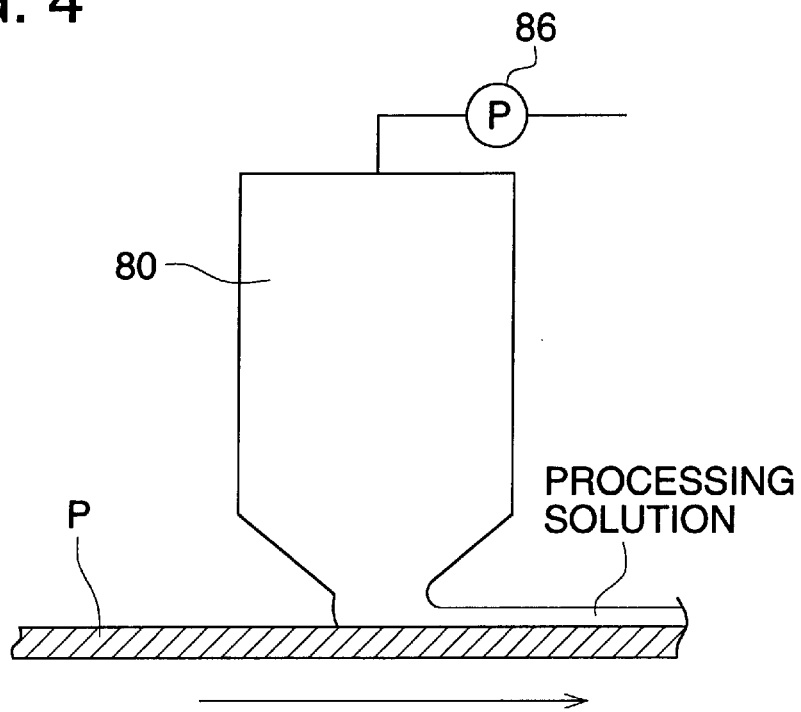
FIG. 4 is a drawing showing a constitution of a coating means.
Figure 5:
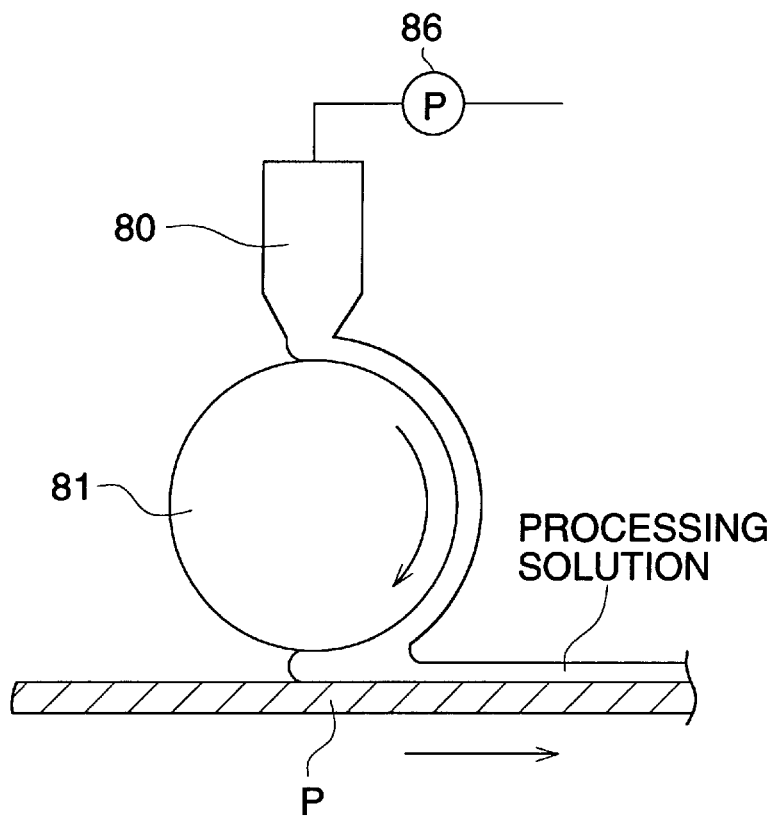
FIG. 5 is a drawing showing another constitution of a coating means.
Figure 6:
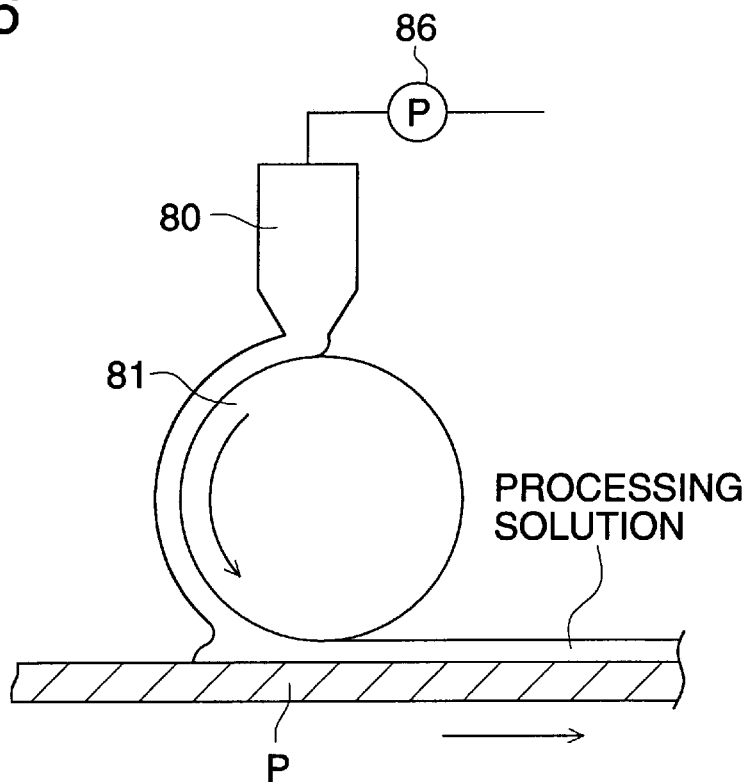
FIG. 6 is a drawing showing still another constitution of a coating means.
Figure 7:
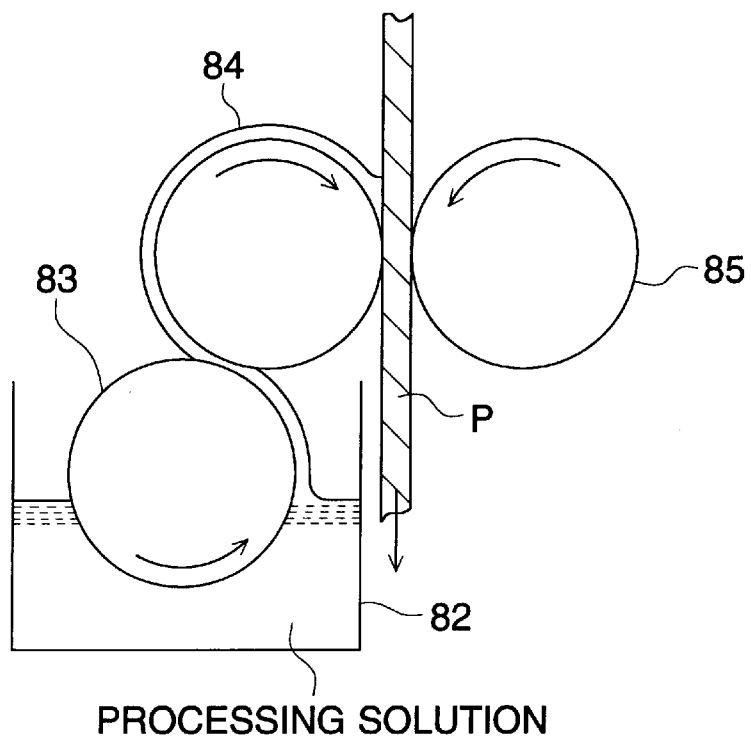
FIG. 7 is a drawing showing yet another constitution of a coating means.

Coating means can be constituted either in FIG. 4 or 7. In an embodiment as shown in FIG. 4, due to actuation of pump 86, the processing liquid is fed to feeding head 80. Aforesaid processing liquid is emitted from feeding head 80, and is directly coated onto the emulsion surface of silver halide photographic light-sensitive material P. In the embodiment as shown in FIG. 5, the processing liquid is emitted from feeding head 80 onto coating roller 81. Aforesaid coating roller 81 rotates counter as the conveyance direction of silver halide photographic light-sensitive material P. From coating roller 81, the processing liquid is coated onto the emulsion surface of silver halide photographic light-sensitive material P. The embodiment shown in FIG. 6 is constituted in the same manner as in FIG. 5 except that coating roller 81 rotates in the same direction as the conveyance direction of silver halide photographic light-sensitive material P. From coating roller 81, the processing liquid is coated onto the emulsion surface of silver halide photographic light-sensitive material P. In the embodiment shown in FIG. 7, the processing liquid stored in tank 82 is fed to coating roller 84 which is one of paired rollers 84 and 85 due to rotation of feeding roller 83. Paired coating rollers 84 and 85 conveys silver halide photographic light-sensitive material P downward. At that time, the processing liquid from coating roller 84 is coated onto the emulsion surface of silver halide photographic light-sensitive material P.

Next, an example of an automatic processing machine for silver halide photographic light-sensitive material will be explained.

[Automatic Processing Machine for Silver Halide Photographic Light-sensitive Material]

In FIG. 1, an automatic processing machine in which a silver halide photographic light-sensitive material moves horizontally, under a flat status and linearly. However, according to the constitution, the number of the coating section is reduced to one, several rollers are removed or interval between each machine is modified.

[Silver Halide Photographic Light-sensitive Material]

QA-A6 paper, produced by Konica Corporation, exposed in accordance with a conventional method was used.

[Processing Liquid]

As processing liquids, the following ones were used.

Color Developer-1: (CD-1)

| | |
|---|---|
| Sodium sulfite | 0.2 g |
| Disodium bis (sulfoethyl) hydroxylamine | 12.0 g |
| Pentasodium pentaacetic acid diethylenetriamine | 3.0 g |
| Polyethylene glycol #4000 | 8.0 g |
| Potassium carbonate | 45.0 g |
| Sodium p-toluene sulfonic acid | 15.0 g |
| 4-amino-3-methyl-N-ethyl-N-[(β-(methanesulfoneamide) ethyl] aniline sulfate (CD-3) | 12.0 g |

By the use of potassium hydroxide or sulfuric acid, pH was regulated to 11.0, and the solution was diluted with water to make 1 liter.

Color Developer-2A: (CD-2A)

| | |
|---|---|
| Sodium sulfite | 0.4 g |
| Pentasodium pentaacetic acid diethylenetriamine | 3.0 g |
| Polyethylene glycol #4000 | 6.0 g |
| Sodium p-toluene sulfonic acid | 30.0 g |
| CD-3 | 24.0 g |

By the use of potassium hydroxide or sulfuric acid, pH was regulated to 1.5, and the solution was diluted with water to make 1 liter.

2B: (CD-2B)

| | |
|---|---|
| Pentasodium pentaacetic acid diethylenetriamine | 3.0 g |
| Polyethylene glycol #4000 | 10.0 g |
| Potassium carbonate | 90.0 g |

By the use of potassium hydroxide or sulfuric acid, pH was regulated to 13.0, and the solution was diluted with water to make 1 liter.

[Developing Conditions]
(1) When the processing liquid is CD-1,
    Coating amount: 40 ml/m$^2$
    Time: 12 seconds
    Step: as shown in Table 1
(2) When the processing liquid is CD-2A→CD-2B
    Coating amount: 20 ml/m$^2$
    Time: 12 seconds
    Step: 2 seconds between coating and squeezing
        2 seconds between squeezing and coating
        2 seconds between coating and squeezing
        6 seconds between squeezing and BF
(3) When the processing liquid is CD-2B→CD-2A
    Coating amount: 20 ml/m$^2$
    Time: 12 seconds
    Step: 2 seconds between coating and squeezing
        2 seconds between squeezing and coating
        2 seconds between coating and squeezing
        6 seconds between squeezing and BF

[Evaluation]

After the light-sensitive material was subjected to developing under the above-mentioned specifications, it was subjected to BF (CPK-2-20, P-2, 35° C., 45 sec.), washing (flowing water, for 3 min.) and drying (at 60° C. for 10 minutes). Then, the density of 10 arbitrary points of yellow density (440 nm) in D-max portions of the light-sensitive material was measured. From its mean value, a relative standard coefficient was calculated and evaluated as the dispersion.

The number of paper conveyance problems when 100 sheets of papers having the same size each other were fed from one roll magazine was evaluated.

A: Problem occurred no time during passage of 100 sheets.
B: 1–2 sheets caused a problem during passage of 100 sheets.
C: 3–10 sheets caused a problem during passage of 100 sheets.
D: 11 sheets or more caused a problem during 100 sheets.

Table 1 shows the results thereof.

Figure 8:
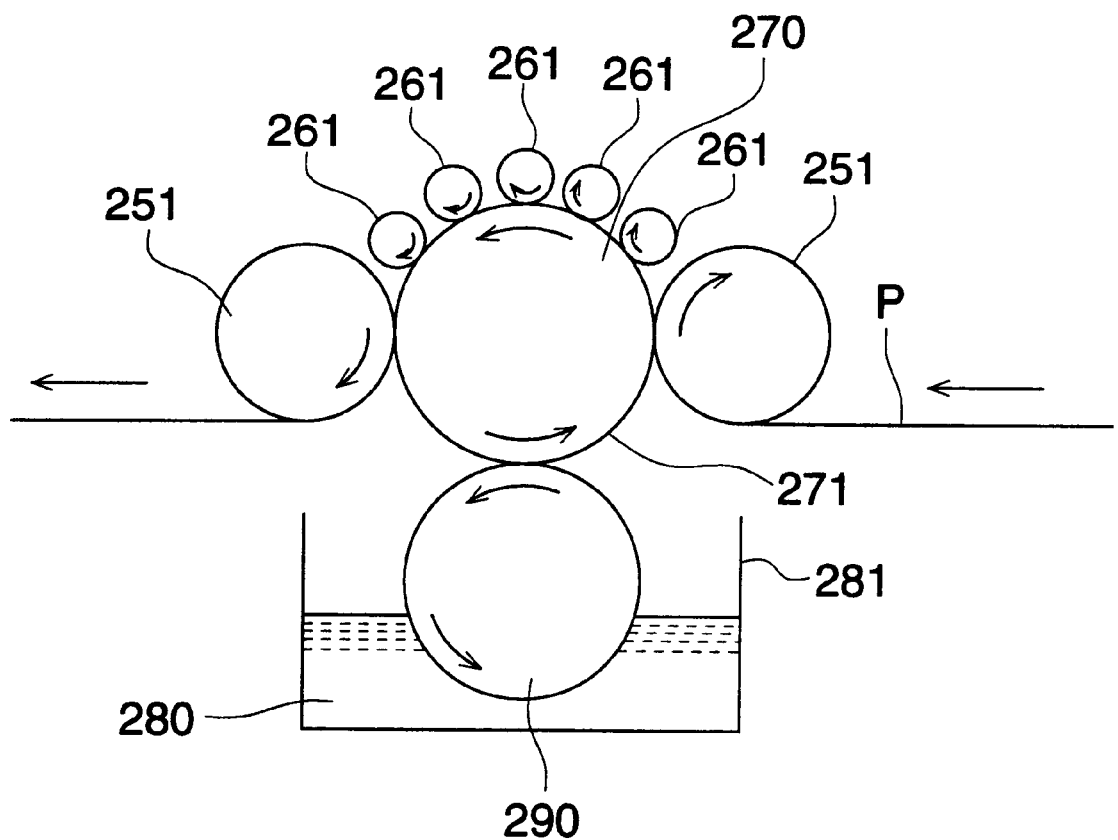
FIG. 8 is a drawing showing a comparative example of an roller dip roll type of the prior art.
Figure 9:
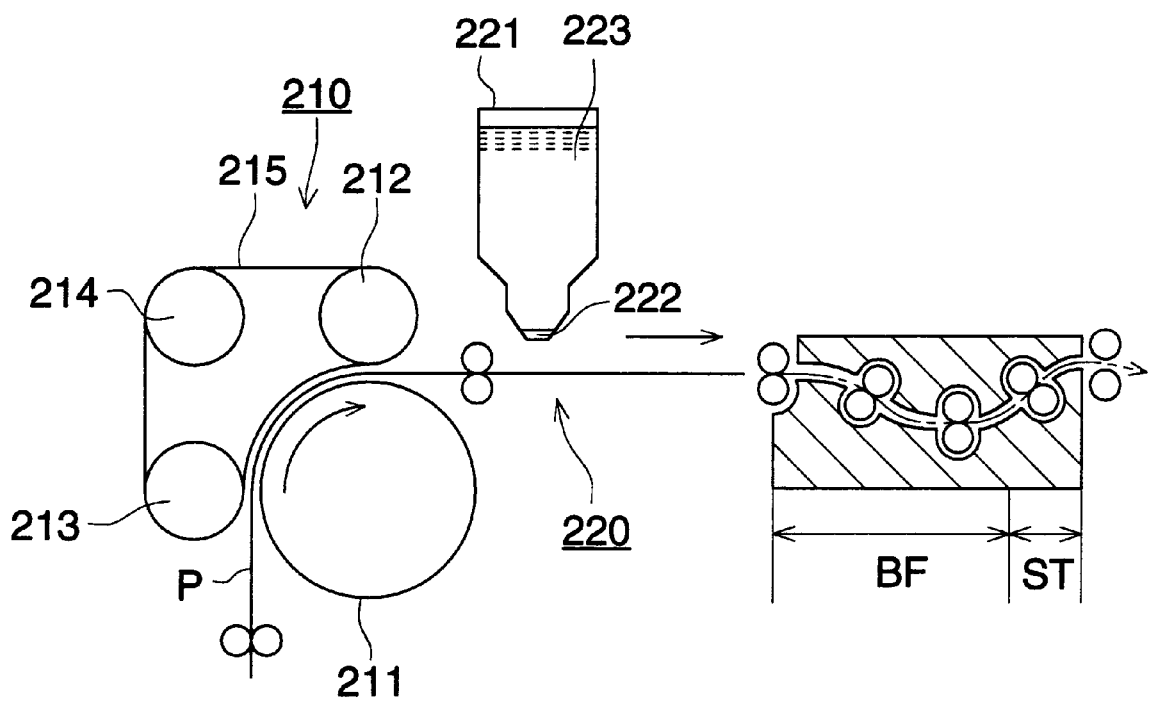
FIG. 9 is a drawing showing a comparative example of an ink jet type of the prior art.

As comparative examples, a roller-dipping-roll type shown in FIG. 8 and an ink-jet type shown in FIG. 9 were employed.

In FIG. 8, a schematic block diagram of a roller-dipping-roll type is shown. By causing the surface 271 of processing roller 270 being brought into contact with the surface of silver halide photographic light-sensitive material P, the processing liquid is transferred and adheres onto silver halide photographic light-sensitive material P for processing. Numeral 280 represents the processing liquid. Numeral 281 represents a processing liquid tank. Numeral 290 represents a feeding roller. Numeral 251 represents auxiliary rollers. Numeral 261 represents back-up rollers. Feeding roller 290 contacts the surface of processing roller 270 at the upper end thereof. The lower portion is dipped in processing liquid 280.

Therefore, if processing roller 270 and feeding roller 290 respectively rotate in the arrowed directions, the processing liquid adhered on the surface of feeding roller 290 moves to a nip portion with processing roller 270, where the processing liquid is transferred to and adhered onto the surface of processing roller 270 while being pressed. Accordingly, on the surface of processing roller 270, the processing liquid adheres with high uniformity. Further, silver halide photographic light-sensitive material P moves in the arrowed direction while being brought into close contact with the surface of processing roller 270 by means of auxiliary rollers 251, back-up roller 261 and processing roller 270. Therefore, in an area where silver halide photographic light-sensitive material P is brought into contact with processing roller 270, the processing liquid on the surface of processing roller 270 adheres onto the whole surface of silver halide photographic light-sensitive material P so that processing is completed.

FIG. 9 shows a schematic block diagram when an ink jet head is used. On the upstream of the conveyance path of silver halide photographic light-sensitive material P processed by the processing liquid, heating means 210 which heats silver halide photographic light-sensitive material P is provided. In heating means 210, heating drum 211 is provided. Above heating drum 211, roller 212 on the outlet side is provided. Left of heating drum 211, roller 213 on the inlet side is provided. Left of roller 212 on the outlet side and above roller 213 on the inlet side, pressure belt driving roller 214 is provided. Pressure belt is bridged over roller 212 on the outlet side, above roller 213 on the inlet side and pressure belt driving roller 214, moves over 90° of the circumference of heating drum 211 while being pressed by heating drum 211. Due to this condition, silver halide photographic light-sensitive material P is pressed onto heating drum 211 during conveyance. Due to the above, silver halide photographic light-sensitive material P is heated. On the downstream of conveyance path of silver halide photographic light-sensitive material P from heating drum 211, photographic processing means 220 is provided. Photographic processing means 220 incorporates processing liquid container 221, which houses a color developer with which to process silver halide photographic light-sensitive material P. Processing liquid container 221 is tightly closed against ambient air. As a processing liquid feeding means 222, a bubble-jet type linear feeding head is used. Due to this, processing liquid feeding means 222 feeds a color developer onto the emulsion surface of silver halide photographic light-sensitive material P heated by heating means 210 through a gas phase.

TABLE 1

| No. | System name | Paper size (mm, lateral × transversal) | Coating section | Interval between a coater and a roller | Developer | Heating section | Dmax unevenness | Conveyance jamming | Remarks |
| --- | --- | --- | --- | --- | --- | --- | --- | --- | --- |
| 1 | Roller-dip-roll type | 127 × 2000 | One | — | CD-1 | 50° C. | ±2.0% | A | Comp. |
| 2 | Roller-dip-roll type | 127 × 89 | One | — | CD-1 | 50° C. | ±17.7% | D | Comp. |
| 3 | Ink-jet type | 127 × 2000 | One | — | CD-1 | 50° C. | ±2.1% | A | Comp. |
| 4 | Ink-jet type | 127 × 89 | One | — | CD-1 | 50° C. | ±13.5% | D | Comp. |
| 5 | Type shown in FIG. 1 | 127 × 2000 | One | — | CD-1 | 50° C. | ±1.9% | A | Comp. |
| 6 | Type shown in FIG. 1 | 127 × 89 | One | — | CD-1 | 50° C. | ±6.3% | A | Inv. |
| 7 | Type shown in FIG. 1 | 127 × 89 | One | 10 seconds | CD-1 | 50° C. | ±4.7% | A | Inv. |
| 8 | Type shown in FIG. 1 | 127 × 89 | One | 5 seconds | CD-1 | 50° C. | ±3.9% | A | Inv. |
| 9 | Type shown in FIG. 1 | 127 × 89 | One | 2 seconds | CD-1 | 50° C. | ±0.4% | A | Inv. |
| 10 | Type shown in FIG. 1 | 127 × 89 | Two | 2 seconds | CD-2A→CD-2B | 50° C. | ±0.4% | A | Inv. |
| 11 | Type shown in FIG. 1 | 127 × 89 | Two | 2 seconds | CD-2B→CD-2A | 50° C. | ±1.9% | A | Inv. |
| 12 | Type shown in FIG. 1 | 127 × 89 | One | 2 seconds | CD-1 | Not exist | ±10.9% | A | Comp. |
| 13 | Type shown in FIG. 1 | 127 × 89 | One | 2 seconds | CD-1 | 40° C. | ±3.7% | A | Inv. |

As is apparent from Table 1, in the case of a system in which a processing liquid is coated onto a roll-type silver halide photographic light-sensitive material (FIG. 8) and a system in which an ink jet type processing liquid is coated onto the silver halide photographic light-sensitive material through a gas phase (FIG. 9), no problem occur when processing a long roll paper. However, if a cut paper is processed, unevenness occurs on developing so that conveyance jamming occurs. However, it is understood that the constitution of the present invention solves the problems, eliminating the occurrence of unevenness.

When the light-sensitive material is not heated, unevenness occurs at Dmax portions. Therefore, heating temperature is necessarily 40° C. or more and preferably 50° C. or more. Time duration between the coater and the roller is preferably within 10 sec., and more preferably within 5 sec. Two-liquid coating is preferable compared with one-liquid coating. In such a case, a developing agent part is coated prior to an alkaline part.

FIGS. 10(a) through 10(e) show examples (in which the processing liquid is fed by means of a rotation roller) of a medium-contact type processing liquid feeding means which feeds liquid by contacting the light-sensitive material with a liquid feeding medium, which retains the processing liquid, such as a processing liquid feeding roller, a sponge or a felt. FIG. 10(a) shows a front view of processing liquid feeding member 103. FIG. 10(b) shows a top view of processing liquid feeding member 103. FIG. 10(c) shows a side view of processing liquid feeding member 103. FIG. 10(d) is a schematic view showing one example of a medium-contact type processing liquid feeding means employing processing liquid feeding roller 106. FIG. 10(e) shows a side view of the medium-contact type processing liquid feeding means as shown in FIG. 10(d).

Processing liquid 102 is pressed by processing liquid feeding pump 104 (preferably, its feeding amount is 0.4 ml/sec.) to be fed onto uniformly light-sensitive material 101 (preferably, the light-sensitive material conveyance speed is 30 mm/sec.) from nozzle 105 (preferably, the length of porous processing liquid feeding section is 300 mm) in processing liquid feeding member 103 through processing liquid feeding roller 106 (rotating roller) which is a liquid feeding medium.

FIGS. 11(a) and (b) show another example (in which the processing liquid is brought up by a rotation roller to be fed onto the light-sensitive material) of a medium-contact type processing liquid feeding means in which a processing liquid feeding roller 126 (which is a liquid feeding body) brings up the processing liquid from a trough 123 (a saucer shaped container) retaining the processing liquid and the processing liquid is brought into contact with the light-sensitive material for feeding. FIG. 11(a) shows a front view and FIG. 11(b) shows a side view.

Processing liquid 122 is fed onto uniformly liquid 121 without unevenness by means of processing liquid feeding roller 126 in processing liquid feeding member 123 (preferably, the light-sensitive material conveyance speed is 30 mm/sec.).

Figure 12:
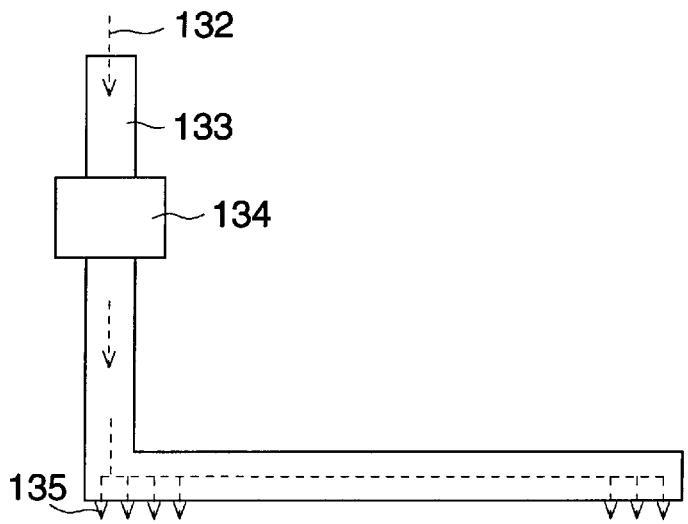
FIGS. 12(a) to 12(e) are drawings showing still another example (a porous processing liquid feeding section feeds the processing section)) of a medium-contact type processing liquid feeding means.
Figure 12:
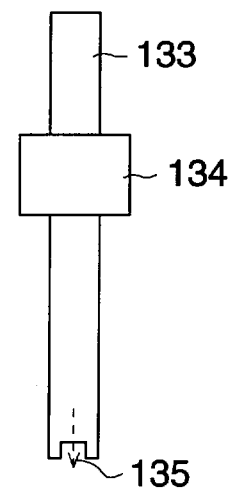
Figure 12:
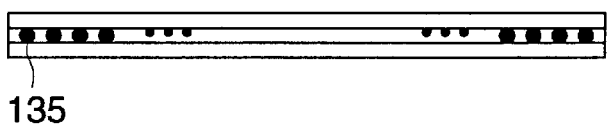
Figure 12:
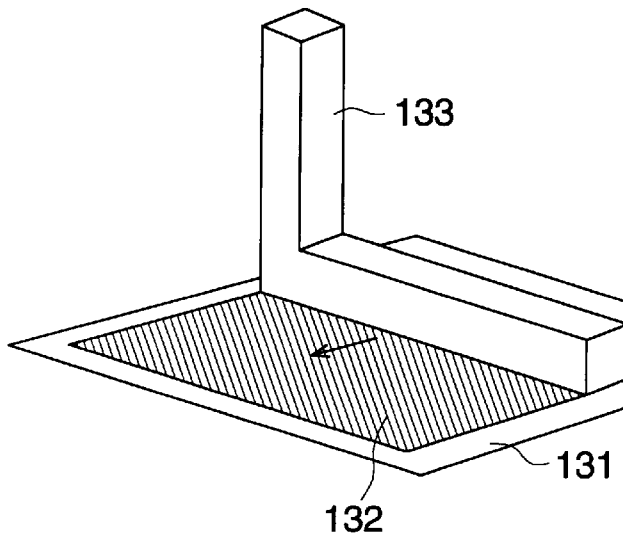
Figure 12:
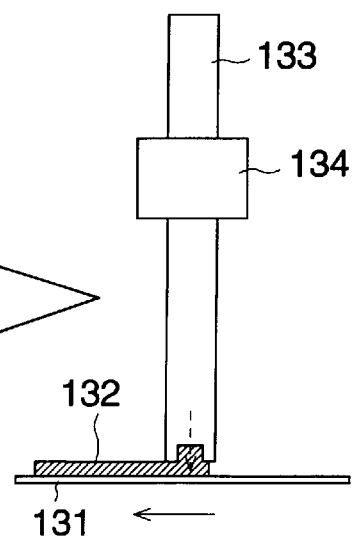

FIGS. 12(a) through (e) show another example (the processing liquid is fed from a porous processing liquid feeding section) of a medium contact type processing liquid feeding means which feeds the processing liquid onto the light-sensitive material while the processing liquid feeding means is brought into contact with the emulsion surface. FIG. 12(a) shows a front view of processing liquid feeding member 133, FIG. 12(b) is a top view of processing liquid feeding member 133, FIG. 12(c) shows a side cross sectional view, FIG. 12(d) is a schematic drawing showing one example of a medium contact type processing liquid feeding means which feeds the processing liquid onto the light-sensitive material while the processing liquid feeding section is brought into contact with the emulsion surface, FIG. 12(e) shows a cross sectional side view of the medium-contact type processing liquid feeding means shown in FIG. 1(d).

Processing liquid 132 is pressed by processing liquid feeding pump 134 (preferably, its feeding amount is 0.4 ml/sec.) to be fed onto unformly light-sensitive material 101 (preferably, the light-sensitive material conveyance speed is 30 mm/sec.) from nozzle 135 (preferably, the size of nozzle hole was 100 μm and the interval of the hole was 2 mm) in processing liquid feeding member 133 (the length of porous processing liquid feeding section was 300 mm).

FIGS. 13(a) through (e) are drawings showing one example of a contact type processing liquid feeding means in which the liquid is fed utilizing the surface tension of the liquid fed and the liquid is brought into contact with the emulsion surface of the light-sensitive material. FIG. 13(a) shows a front view of processing liquid feeding member 143, FIG. 13(b) shows a top view of processing liquid feeding member 143, FIG. 13(c) shows a side cross sectional view of processing liquid feeding member 143, FIG. 13(d) is a schematic drawing showing one example of a contact type processing liquid feeding means in which the liquid is fed utilizing the surface tension of the liquid fed and the liquid is brought into contact with the emulsion surface of the light-sensitive material. FIG. 13(e) shows a side cross sectional view of the contact type processing liquid feeding means as shown in FIG. 13(d).

Processing liquid 142 is pressed by processing liquid feeding pump 144 (preferably, its feeding amount is 0.4 ml/sec.) to be fed. The liquid is fed onto light-sensitive material 141 (preferably, the light-sensitive material conveyance speed is 30 mm/sec.) from nozzle 145 in processing liquid feeding member 143 to slit processing liquid feeding section 146 (preferably, the slit width was 100 μm and the slit length was 300 mm) utilizing the surface tension of the liquid fed. by contacting the liquid onto the emulsion surface of the light-sensitive material, the liquid is fed onto light-sensitive material 141 (preferably, the light-sensitive material conveyance speed was 30 mm/sec.) to be coated.

Figure 14:
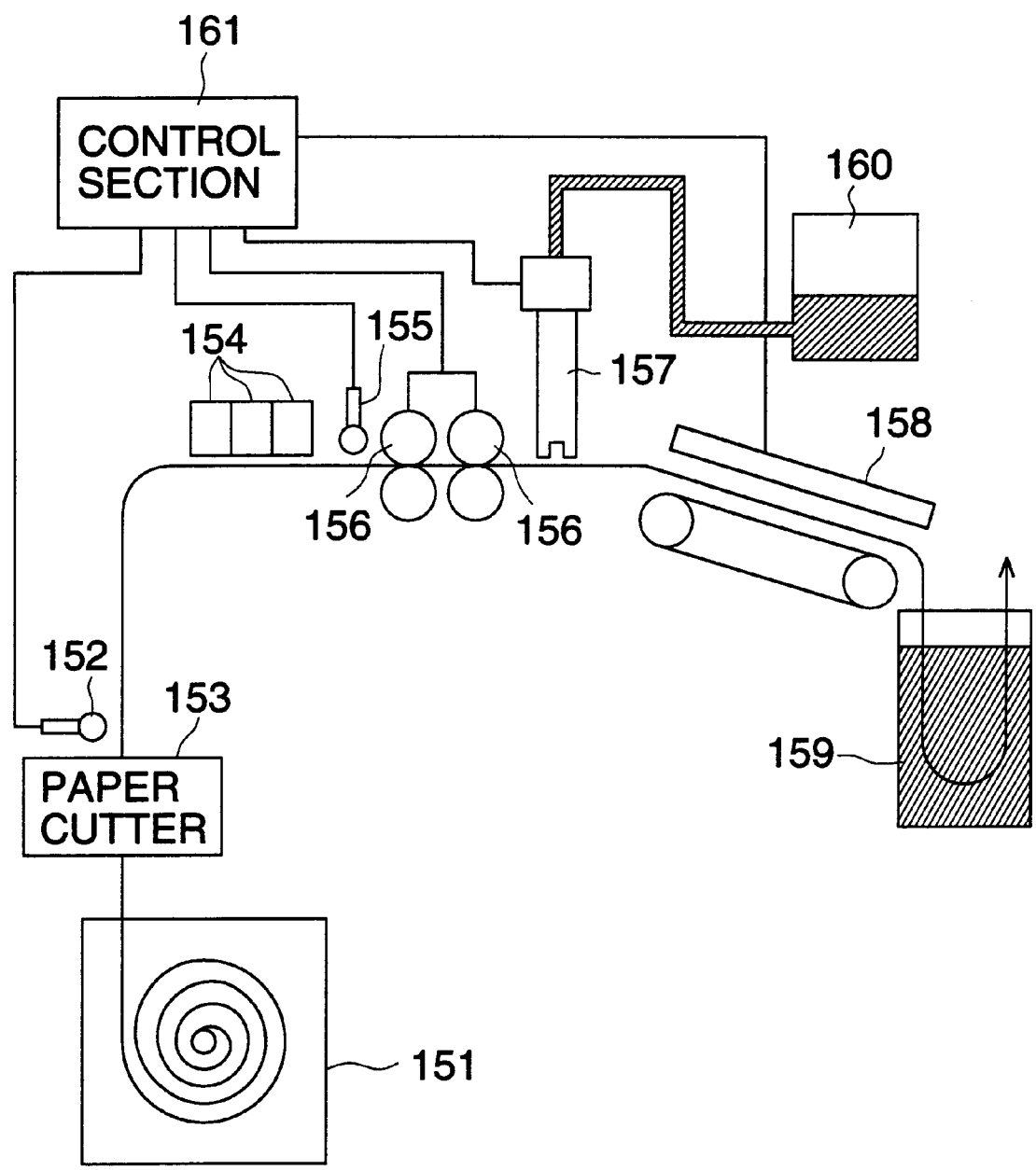
FIG. 14 is a block schematic drawing showing one example of an embodiment of a color photographic processing of an automatic processing machine for silver halide photographic light-sensitive material.(As a processing liquid feeding section, one example of a processing liquid feeding means (slit shaped processing liquid feeding section)

FIG. 14 is a schematic block diagram showing one example of an embodiment of a color developing process in an automatic processing machine for silver halide photographic light-sensitive material of the present invention. Aforesaid automatic processing machine employs one example of a processing liquid feeding means (a slit processing liquid feeding section) as shown in FIG. 13, as a processing liquid feeding section.

Incidentally, aforesaid automatic processing machine is also provided with processing liquid stocking tank 160 for color developing and control section 161.

Using FIG. 14, aforesaid automatic processing machine is explained.

First, a color paper (color paper QA-A6 produced by Konica Corporation, the width is 30 cm) is unwound from paper magazine 151. Conveyance of color paper starts. Paper sensing sensor 152 located besides paper magazine 151 operates to sense the paper. Thereby, heating by preheating roller 156 in photographic processing section and surface heater 158 after a coating step starts.

After drawing of the color paper for a prescribed length is completed, paper cutter 153 operates. The cut color paper is fed to a paper exposure section 154 where the color paper is exposed. At this moment, the surface temperature of pre-heating roller 156 in the photographic processing section and the surface heater 158 after a coating step reaches a prescribed temperature so that preparation of control of temperature at a prescribed degree is completed. Thereafter, the surface temperature of pre-heating roller 156 in photographic processing section and surface heater 158 after a coating step is kept at aforesaid prescribed degree until paper sensor 152 senses that paper does not passes during a prescribed time.

When color paper exposed in exposure section 154 is conveyed to additionally upward, paper sensor 155 located on the downstream of paired pre-heating rollers 156 in photographic processing operates to sense paper. Therefore, liquid feeding operation by processing liquid feeding and coating section 157 for color developing starts. Liquid feeding operation is continued until paper sensor 155 senses that paper has not passed during a prescribed time.

Due to sensing by paper sensor 152 located beside paper magazine 151, heating of the paper starts. The paper, which has passed paper sensor 155 has already been completed preparation for heating, and passed paired pre-heating rollers 156 in photographic processing section, by which, the paper is stably heated without unevenness at a prescribed temperature. Due to sensing by paper sensor 155, liquid feeding operation starts. In processing liquid feeding and coating section 157 for color developing where liquid feeding operation is stable, a processing liquid for color developing is stably coated without unevenness. Successively, due to surface heater 158 in which preparation of temperature control at a prescribed degree has already been comtroughd, the paper is subjected to heating and photographic processing. Liquid feeding operation of processing liquid feeding and coating section 57 for color developing is stopped when paper sensor 155 senses that no paper has passed for a prescribed time so that unnecessary operations can be avoided. Heating by pre-heating roller 156 and surface heater 158 after the coating step is stopped when paper sensor 152 senses that no paper has passed for a prescribed time so that unnecessary operation can be saved. Color paper subjected to color developing is subjected to bleach-fixing in bleach-fixing tank 159 in the subsequent step. Then, the color paper is subjected to stabilizing in a first stabilizing tank, a second stabilizing tank and a third stabilizing tank. Then, the paper is then dried in a drying section. Thus, a photographic print having no uneven development was obtained.

As is apparent from the above-mentioned results, in the present invention, due to providing a step having processing liquid feeding and coating section 157, for color developing, which is a means for feeding and coating the processing liquid, paper sensor 155, located upstream in the conveyance path compared with aforesaid a step having processing liquid feeding and coating section 157, which is a means for sensing a silver halide photographic light-sensitive material and a control means which starts operation of the means for feeding and coating aforesaid processing liquid before aforesaid silver halide photographic light-sensitive material is conveyed to the step having the above-mentioned processing liquid feeding and coating means by means of a signal from aforesaid sensing means, the processing liquid can be uniformly fed and coated at the leading end of the photographic paper.

Therefore, due to an invention of a constitution in item 18, it is possible to use a silver halide photographic light-sensitive material efficiently and stable processing performance in which no uneven development occurs can be attained.

In the present invention, by heating the silver halide photographic light-sensitive material by paper sensor 152 which is a sensing means located on upstream side compared with pre-heating roller 156 which is a heating step in such a manner that the temperature on the surface of the emulsion of aforesaid silver halide photographic light-sensitive material when the processing liquid is fed and coated onto the silver halide photographic light-sensitive material is 40° C. or more and 90° C. or less, stable processing performance can be maintained and rapid processability can be exhibited.

Accordingly, due to the present invention, stable processing performance and rapid processability can be attained.

Figure 15:
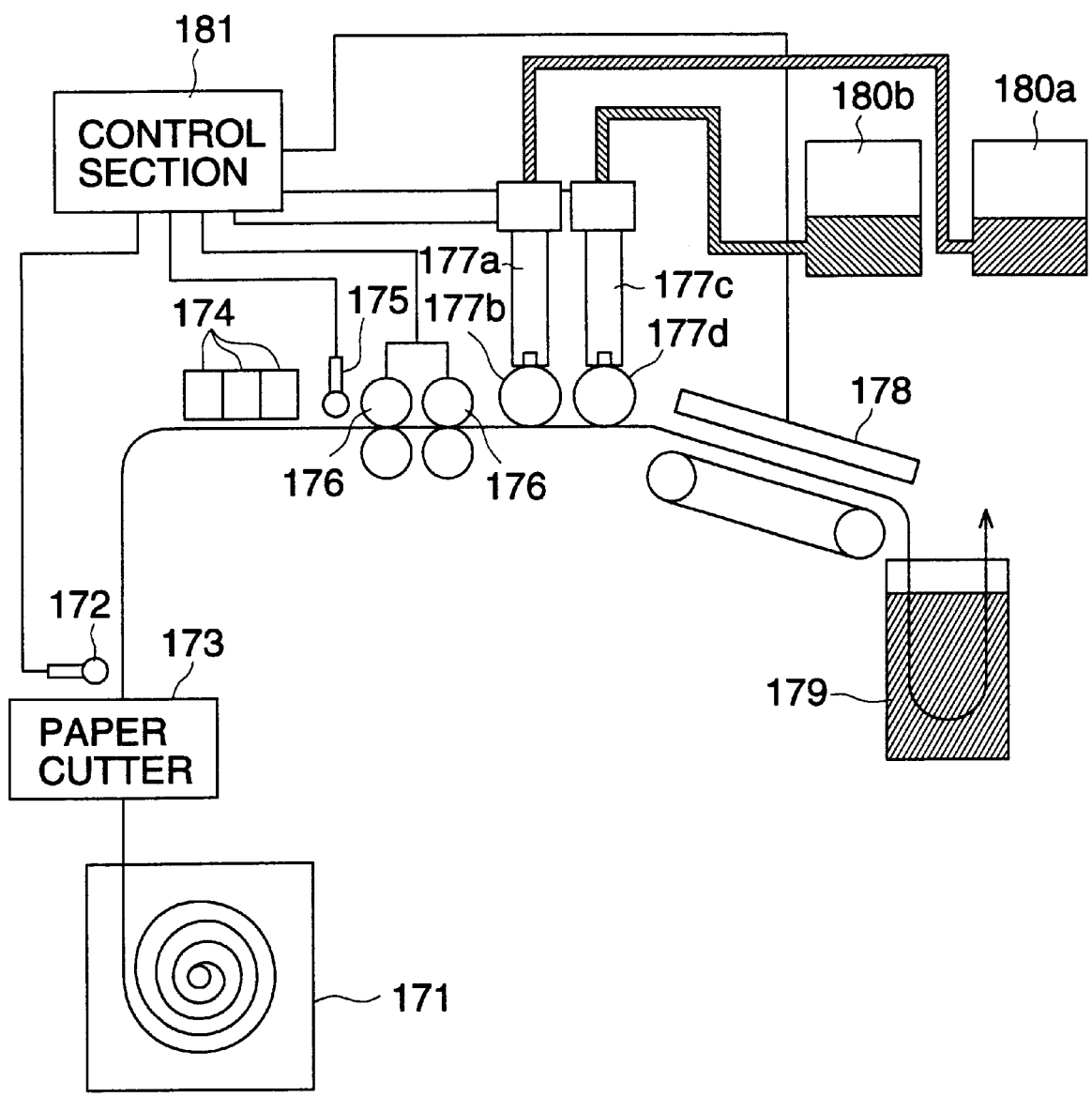
FIG. 15 is a schematic block diagram showing an embodiment of a color developing processing of an automatic processing machine for silver halide photographic light-sensitive material of the present invention (as a processing liquid feeding section, one example of a medium contact type processing liquid feeding means (a processing feeding section in which the processing liquid is fed by means of rotation rollers) shown in FIG. 1 is used).

FIG. 15 is a schematic block diagram showing one example of an embodiment of a color developing process in an automatic processing machine for silver halide photographic light-sensitive material of the present invention. Aforesaid automatic processing machine employs one example of a processing liquid feeding means (a processing liquid feeding section feeds a processing liquid with a rotation roller) as previously shown in FIG. 10, as a processing liquid feeding section. As coating liquid, a color developing agent solution and an alkaline liquid are respectively fed and coated.

Incidentally, aforesaid automatic processing machine is also provided with color developing agent solution stocking tank 80*a*, alkaline solution stocking tank 80*b* and control section 81.

Using FIG. 15, aforesaid automatic processing machine will be explained.

First, a color paper (color paper QA-A6 produced by Konica Corporation, the width is 30 cm) is unwound from paper magazine 171. Conveyance of color paper starts. Paper sensing sensor 172 located besides paper magazine 171 operates to sense the paper. Thereby, activation of pre-heating roller 176 in photographic processing section and surface heater 178 after a coating step starts.

After unwinding of the color paper for a prescribed length is completed, paper cutter 173 operates. The cut color paper is fed to a paper exposure section 174 where the color paper is exposed. At this moment, the surface temperature of pre-heating roller 176 in photographic processing section and surface heater 178 after a coating step reaches a prescribed temperature so that preparation of control of temperature at a prescribed degree is completed. Thereafter, the surface temperature of pre-heating roller 176 in photographic processing section and surface heater 178 after a coating step is kept at aforesaid prescribed degree until paper sensor 172 senses that no paper has passed for a prescribed time.

When color paper exposed in exposure section 174 is conveyed to additionally upward, paper sensor 175 located on the downstream of paired pre-heating rollers 176 in photographic processing operates to sense paper. Therefore, liquid feeding operation by color developing agent solution feeding and coating section 177*a* and alkaline solution feeding and coating section 177*c* starts. Liquid feeding operation is continued until paper sensor 175 senses that no paper has passed for a prescribed time.

Due to sensing of paper sensor 172 located beside paper magazine 171, heating of the paper starts. The paper which has passed paper sensor 175 has already been completed preparation for heating, and has passed paired pre-heating rollers 176 in photographic processing section. Therefore, the paper is stably heated without unevenness at a prescribed temperature. Due to sensing by paper sensor 175, liquid feeding operation starts. In color developing agent solution feeding and coating section 177a (color developing agent solution coating roller 177b) and alkaline solution feeding and coating section 177c (alkaline solution coating roller 177d) where liquid feeding operation is stable, a processing liquid for color developing is stably coated without unevenness. Successively, due to surface heater 178 in which preparation of temperature control at a prescribed degree has already been completed, the paper is subjected to heating and photographic processing. Liquid feeding operation of color developing agent solution feeding and coating section 177a and alkaline solution feeding and coating section 177c is stopped when paper sensor 155 senses that the paper does not pass for a prescribed time so that unnecessary operation can be cancelled. Heating by pre-heating roller 176 and surface heater 178 after the coating step is stopped when paper sensor 172 senses that the paper does not pass for a prescribed time so that unnecessary operation can also be cancelled. Color paper subjected to color developing is subjected to bleach-fixing in bleach-fixing tank 159 in the succeeding step. Then, the color paper is subjected to stabilizing in a first stabilizing tank, a second stabilizing tank and a third stabilizing tank. Then, the paper is dried in a drying section. Thus, a photographic print having no uneven development was obtained.

As is apparent from the above-mentioned results, in the present invention, due to providing a step having color developing agent solution feeding and coating section 177a and alkaline solution feeding and coating section 177c, for color developing, which is a means for feeding and coating the processing liquid, paper sensor 175, located upstream side in the conveyance path compared with aforesaid a step having color developing agent solution feeding and coating section 177a and alkaline solution feeding and coating section 177c, which is a means for sensing a silver halide photographic light-sensitive material and a control means which starts operation of a means for feeding and coating aforesaid processing liquid respectively before aforesaid silver halide photographic light-sensitive material is conveyed to the step having the above-mentioned processing liquid feeding and coating means by means of a signal from aforesaid sensing means, the processing liquid can uniformly be fed and coated at the leading end of a photographic paper.

Therefore, it is possible to use a silver halide photographic light-sensitive material efficiently and stable processing performance in which no uneven development occur can be attained.

In the present invention, by heating the silver halide photographic light-sensitive material by paper sensor 172 which is a sensing means located on upstream side compared with pre-heating roller 176 which is a heating step in such a manner that the temperature on the surface of the emulsion of aforesaid silver halide photographic light-sensitive material when the processing liquid is fed and coated onto the silver halide photographic light-sensitive material is 40° C. or more and 90° C. or less, stable processing performance can be maintained and rapid processability can be exhibited.

Accordingly, due to the present invention, stable processing performance and rapid processability can be attained.

Figure 11:
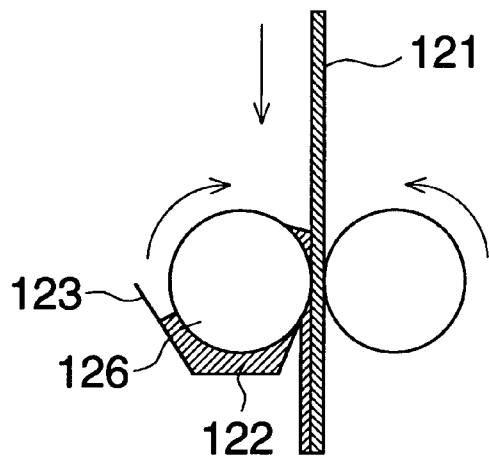
FIGS. 11(a) and 11(b) are drawings showing another example (a processing liquid is brought up by a rotation roller) of a medium contact type processing liquid feeding means.
Figure 11:
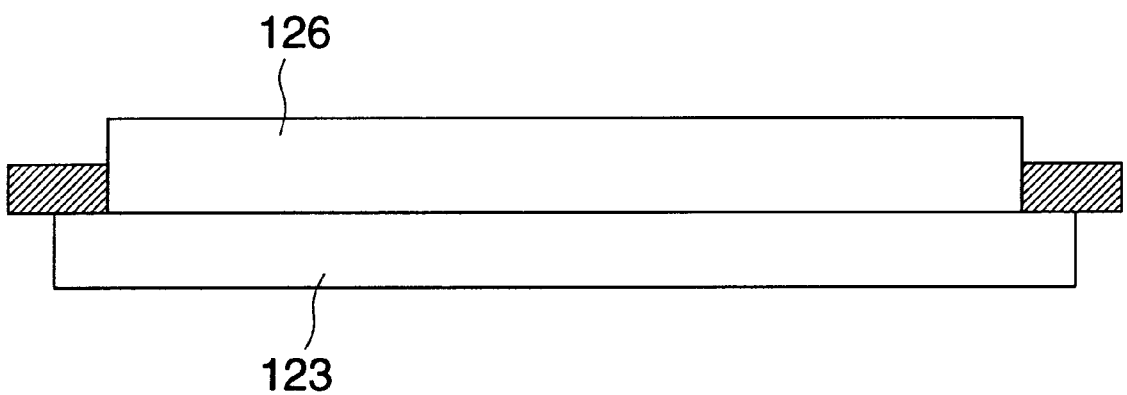

FIG. 15 is a schematic block diagram showing one example of an embodiment of a color developing process in an automatic processing machine for silver halide photographic light-sensitive material of the present invention. Aforesaid automatic processing machine employs one example of a processing liquid feeding means (a processing liquid feeding section feeds a processing liquid by carrying up the processing liquid with a rotation roller) as shown in FIG. 11, as a processing liquid feeding section. As a coating liquid, a color developing agent solution and an alkaline liquid are respectively fed and coated.

Incidentally, aforesaid automatic processing machine is also provided with color developing agent solution stocking tank 100a, alkaline solution stocking tank 100b and control section 101.

Figure 16:
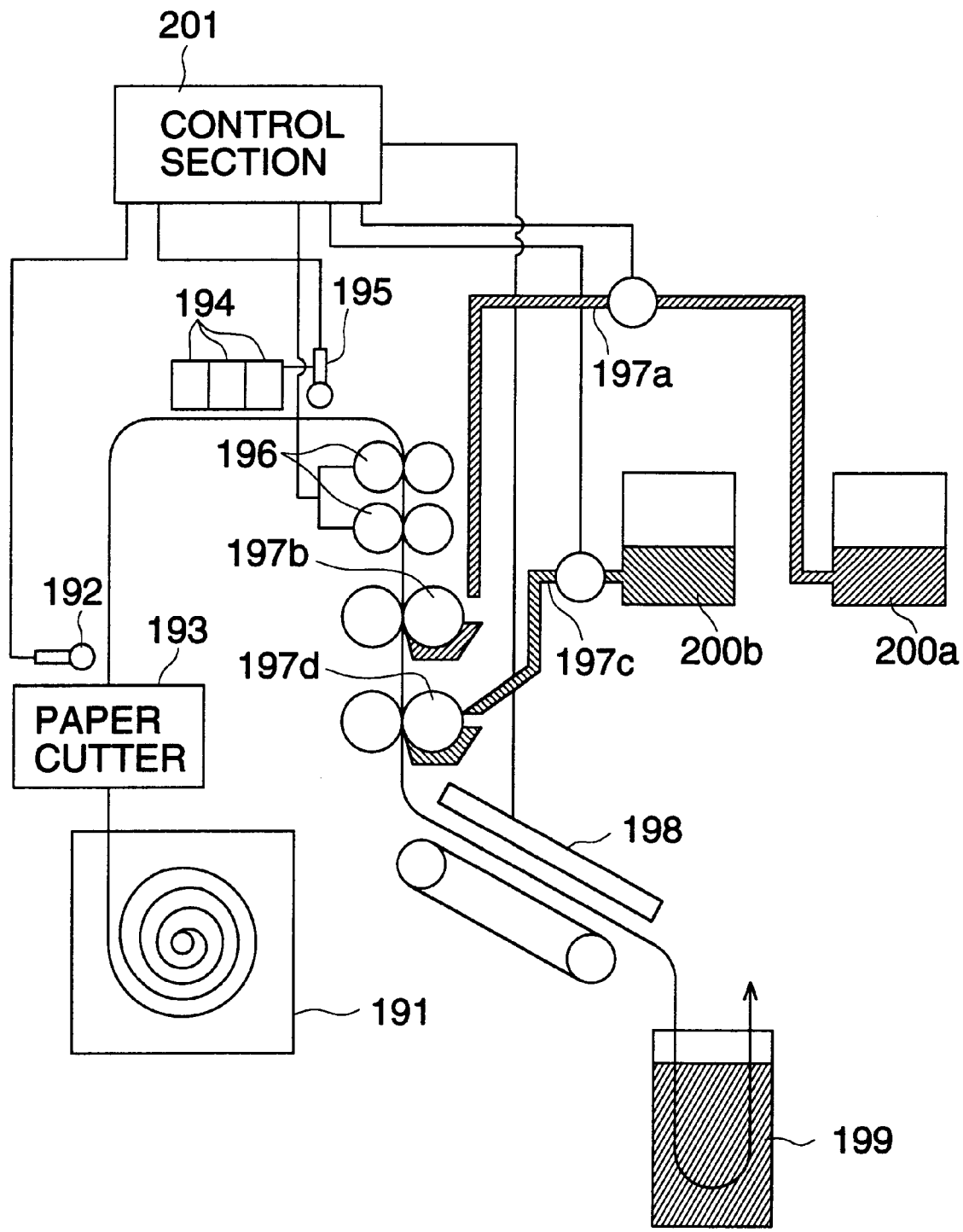
FIG. 16 is a schematic block diagram showing an embodiment of a color developing processing of an automatic processing machine for silver halide photographic light-sensitive material of the present invention (as a processing liquid feeding section, one example of a medium contact type processing liquid feeding means (a processing feeding section in which the processing liquid is fed by being brought up by rotation rollers) shown in FIG. 2 is used).

Using FIG. 16, aforesaid automatic processing machine will be explained.

First, a color paper (color paper QA-A6 produced by Konica Corporation, the width is 30 cm) is unwound from paper magazine 191. Conveyance of color paper starts. Paper sensing sensor 192 located besides paper magazine 191 operates to sense the paper. Thereby, heating by pre-heating roller 196 in photographic processing section and surface heater 198 after a coating step starts.

After drawing of the color paper for a prescribed length is completed, paper cutter 193 operates. The cut color paper is fed to a paper exposure section 194 where the color paper is exposed. At this moment, the surface temperature of pre-heating roller 196 in photographic processing section and surface heater 198 after a coating step reaches a prescribed temperature so that preparation of control of temperature at a prescribed degree is completed. Thereafter, the surface temperature of pre-heating roller 196 in photographic processing section and surface heater 198 after a coating step is kept at aforesaid prescribed degree until paper sensor 192 senses that no paper has passed for a prescribed time.

When color paper exposed in exposure section 194 is conveyed to additionally upward, paper sensor 195 located on the downstream of paired pre-heating rollers 196 in photographic processing operates to sense aforesaid paper. Therefore, liquid feeding operation by color developing agent solution feeding and coating section 197a and alkaline solution feeding and coating section 197c starts. Liquid feeding operation is continued until paper sensor 195 senses that no paper has passed for a prescribed time.

Due to sensing by paper sensor 192 located beside paper magazine 191, heating of the paper starts. The paper which has passed paper sensor 195 has already been completed preparation for heating, and passed paired pre-heating rollers 196 in photographic processing section. Therefore, the paper is stably heated without unevenness at a prescribed temperature. Due to sensing by paper sensor 195, liquid feeding operation starts. In color developing agent solution feeding and coating section 197a (color developing agent solution coating roller 197b) and alkaline solution feeding and coating section 197c (incorporating alkaline solution coating roller 197d) where liquid feeding operation is stable, the processing liquid for color developing is stably coated without unevenness. Successively, due to surface heater 198 in which preparation of temperature control at a prescribed degree has already been completed, the paper is subjected to heating and photographic processing. Liquid feeding operation of color developing agent solution feeding and coating section 197a and alkaline solution feeding and coating section 197c is stopped when paper sensor 155 senses that the paper does not pass for a prescribed time so that unnecessary operations are cancelled. Heating by pre-heating roller 196 and surface heater 198 after the coating step is stopped when paper sensor 192 senses that no paper has passed for a prescribed time so that unnecessary operation can be saved. Color paper subjected to color developing is subjected to bleach-fixing in bleach-fixing tank 159 in the succeeding step. Then, the color paper is subjected to stabilizing in a first stabilizing tank, a second stabilizing tank and a third stabilizing tank. Then, the paper was dried in a drying section. Thus, a photographic print having no uneven development was obtained.

As is apparent from the above-mentioned results, in the present invention, due to providing a step having color developing agent solution feeding and coating section 197a and alkaline solution feeding and coating section 197c, for color developing, which is a means for feeding and coating the processing liquid, paper sensor 195, located upstream side in the conveyance path compared with aforesaid step having color developing agent solution feeding and coating section 197a and alkaline solution feeding and coating section 197c, which is a means for sensing a silver halide photographic light-sensitive material and a control means which starts operation of a means for feeding and coating aforesaid processing liquid before aforesaid silver halide photographic light-sensitive material is conveyed to the step having the above-mentioned processing liquid feeding and coating means by means of a signal from aforesaid sensing means, the processing liquid can uniformly be fed and coated at the leading end of a photographic paper.

Therefore, according to an invention described in item 20, it is possible to use a silver halide photographic light-sensitive material efficiently and stable processing performance in which no uneven development occurs can be attained.

In the present invention, by heating the silver halide photographic light-sensitive material by paper sensor 192 which is a sensing means located on upstream side compared with pre-heating roller 196 which is a heating step in such a manner that the temperature on the surface of the emulsion of aforesaid silver halide photographic light-sensitive material when the processing liquid is fed and coated onto the silver halide photographic light-sensitive material is 40° C. or more and 90° C. or less, stable processing performance can be maintained and rapid processability can be exhibited.

Accordingly, due to the present invention, stable processing performance and rapid processability can be attained.

Experiment Result 1

In embodiment 6, an experiment was conducted. Its conditions and experiment results were shown as follows:
[Processing Liquid Formula (per liter)]
<Color Developing Agent Solution>

| Water | 700 ml |
|---|---|
| Sodium sulfite | 0.4 g |
| Pentasodium diethylenetriamine pentaacetic acid | 3.0 g |
| p-toluenesulfonic acid | 20.0 g |
| 4-amino-3-methyl-N-ethyl-N-(β-(methanesulfonamide) ethylaniline sulfate (CD-3) | 40.0 g |

Water was added to make 1 liter.
Using potassium hydroxide or sulfuric acid, pH was regulated to 2.0.
<Alkaline Solution>

| Water | 600 ml |
|---|---|
| Pentasodium diethylenetriamine pentaacetic acid | 3.0 g |
| Potassium carbonate | 80.0 g |
| p-toluenesulfonic acid | 20.0 g |

Water was added to make 1 liter.
Using potassium hydroxide or sulfuric acid, pH was regulated to 13.0.

For the bleach-fixing step and the stabilizing step, processing conditions and processing agent outlined in the CPK-2-JI process were used.

By means of a heating roller, the color paper was heated to 60° C. for processing.

When processing, color paper (color paper QA-A6 produced by Konica Corporation) having 30 cm width was subjected to uniform exposure. The amount of liquid fed of the color developing agent solution and the alkaline solution was respectively 25 ml per 1 $m^2$ of color paper.

Time for photographic processing step was 10 sec., and time for feeding the photographic processor was 1 sec.

After processing, color density unevenness was observed visually. In addition, at the leading end portion too, the color density unevenness on color paper was not observed.

From the above-mentioned results, in the automatic processing machine of the present invention, due to providing a step having color developing agent solution feeding and coating section 177a and alkaline solution feeding and coating section 177c which are means for feeding and coating the processing liquid, for color developing, which is a means for feeding and coating the processing liquid, paper sensor 175, located upstream side in the conveyance path compared with aforesaid step having color developing agent solution feeding and coating section 177a and alkaline solution feeding and coating section 177c, which is a means for sensing a silver halide photographic light-sensitive material and a control means which starts operation of a means for feeding and coating aforesaid processing liquid before aforesaid silver halide photographic light-sensitive material is conveyed to the step having the above-mentioned processing liquid feeding and coating means by means of a signal from aforesaid sensing means, the processing liquid can uniformly be fed and coated at the leading end of a photographic paper.

Therefore, due to an invention of a constitution in item 18, it is possible to use a silver halide photographic light-sensitive material efficiently and stable processing performance in which no uneven development occur can be attained.

Experiment Result 2

In accordance with Embodiment 5, an experiment was conducted in the same manner as for Experiment Result 1 except that the following were used as processing liquids.
[Processing Liquid Formula (per 1 liter)]
<Processing Liquid for Color Developing>

| Water | 880 ml |
|---|---|
| Pentasodium diethylenetriamine pentaacetic acid | 7.5 g |
| p-toluenesulfonic acid | 50 g |
| 2Na salt of disulfoethylhydroxylamine | 12 g |
| Potassium carbonate | 35 g |
| Polyethylene glycol (the average molecular weight was 4000) | 10 g |
| 4-amino-3-methyl-N-ethyl-N-[(β-(methanesulfoneamide) ethyl]aniline sulfate (CD-3) | 15 g |

Water was added to make 1 liter.
Using potassium hydroxide or sulfuric acid, pH was regulated to 11.0.

As a result, it was confirmed that no uneven development was observed even at the leading end of the paper and that stable processing performance was attained.

Experiment Result 3

Experiment 3 was conducted in accordance with embodiment 6 except that temperature heating color paper was changed by means of a heating roller. Its conditions and experiment results were shown below.

Formula of the processing liquid was the same as in Experiment Result 1 above.

For the bleach-fixing step and the stabilizing step, processing conditions and processing agent outlined in the CPK-2-JI process were used.

When processing, color paper (color paper QA-A6 produced by Konica Corporation) having 30 cm width was subjected to uniform exposure. The amount of liquid fed of the color developing agent solution and the alkaline solution was respectively 25 ml per 1 m² of color paper.

Time for photographic processing step was 10 sec., and time for feeding the photographic processor was 1 sec.

After processing, blue Dmax (B) was measured.

Table 2 shows the results thereof.

TABLE 2

| | Temperature of heating roller (° C.) | $D_{max}$ (B) |
|---|---|---|
| 1 | 30 | 1.61 |
| 2 | 50 | 2.24 |
| 3 | 60 | 2.26 |
| 4 | 80 | 2.26 |
| 5 | 100 | Emulsion surface lost transparency Accordingly, measurement was impossible. |

From the results above, it can be understood that an automatic processing machine of the present invention can realize rapid processing, in which photographic processing stability is still high.

In the present invention, by heating the silver halide photographic light-sensitive material by paper sensor 172 which is a sensing means located on upstream side compared with pre-heating roller 176 and surface heater 178 after the coating step which are heating steps in such a manner that the temperature on the surface of the emulsion of aforesaid silver halide photographic light-sensitive material, when the processing liquid is fed and coated onto the silver halide photographic light-sensitive material is 40° C. or more and 90° C. or less, stable processing performance can be maintained and rapid processability can be exhibited.

Accordingly, due to the present invention, stable processing performance and, also simultaneously, rapid processability can be attained.

Owing to the present invention, an automatic processing machine for silver halide photographic light-sensitive material capable of maintaining stable processing performance without unevenness, even when the processed amount of the light-sensitive material is relatively low.

As described above, a system in which a light-sensitive material is cut prior to processing, aforesaid light-sensitive material is heated to 40° C. or higher and necessary amount of a processing liquid is fed onto the silver halide photographic light-sensitive material, after that, was adopted. Due to this, since processing tanks are removed and fresh liquid is always fed, troublesome processing control is not necessary at all. In addition, due to causing the fed amounts of the processing liquid extremely minute, the amount of effluent is reduced and a very environmentally-friendly system can be provided.

Due to a system in which a silver halide photographic light-sensitive material is cut a desired size prior to exposure, effects of the present invention become evident compared with other methods.

Due to aforesaid coating means, the processing liquid is coated uniformly on the emulsion surface of the silver halide photographic light-sensitive material and thereby the silver halide photographic light-sensitive material can be conveyed surely.

After the coating operation, the silver halide photographic light-sensitive material passes between rollers within 10 seconds. Therefore, the processing liquid coated on the emulsion surface of the silver halide photographic light-sensitive material is caused to be uniform and excessive amount are be removed.

The processing liquid coated on the emulsion surface of the silver halide photographic light-sensitive material is squeezed to be further uniform. In addition, excessive amounts are removed.

Due to applying the present invention to a color developing step, a first processing step, uniform and sure coating can be possible and superiority on the other methods becomes more clear.

Due to providing two or more coating steps, aptitude for rapid processing and aptitude for stable processing can be maintained.

Due to providing a step in which a part liquid whose main component is a color developing agent and a step in which a part liquid whose main component is an alkaline agent, aptitude for rapid processing and aptitude for stable processing can be kept.

Due to coating a part liquid whose main component is a color developing agent and, thereafter, coating a part liquid whose main component is an alkaline agent, aptitude for rapid processing and aptitude for stable processing can further be maintained.

Due to a retention mechanism, a silver halide photographic light-sensitive material can be retained surely. Thus, coating of the processing liquid becomes further uniform and conveyance property of the silver halide photographic light-sensitive material is improved.

What is claimed is:

1. An apparatus for processing a silver halide light sensitive material having an emulsion surface with a processing solution, comprising:

a cutter to cut the silver halide light sensitive material into a sheet-shaped silver halide light sensitive material;

a conveyor to linearly convey the sheet-shaped silver halide light sensitive material such that the sheet-shaped silver halide light sensitive material lays flat on the conveyor;

a heater to heat the sheet-shaped silver halide light sensitive material so as to raise a temperature of the sheet shaped silver halide light sensitive material to be at least 40° C.; and a coater to coat the emulsion surface of the sheet shaped silver halide light sensitive material with the processing solution while the conveyor linearly and flatly conveys the sheet-shaped silver halide light sensitive material, the coater forming a coating layer of the processing solution on the sheet-shaped silver halide light sensitive material, the coater comprising a coating member which spreads the coating layer into a thin layer.

2. The apparatus of claim 1, further comprising an exposing device to conduct imagewise exposing, wherein the exposing device conducts imagewise exposing onto the sheet-shaped silver halide light sensitive material cut by the cutter.

3. The apparatus of claim 1, further comprising a pair of rollers, wherein the sheet-shaped silver halide light sensitive material is conveyed by the conveyor so as to pass between the pair of rollers within not more than 10 seconds after the coating by the coater.

4. The apparatus of claim 3, wherein the pair of rollers are squeezing rollers.

5. The apparatus of claim 1, wherein the processing solution is a color developing solution so that the coater conducts a color developing process by coating the emulsion surface of the sheet-shaped silver halide light sensitive material with the color developing solution.

6. The apparatus of claim 5, wherein the coater comprises at least a first coater and a second coater.

7. The apparatus of claim 6, wherein the first coater coats a first solution containing a color developing agent and the second coater coats a second solution containing an alkali component.

8. The apparatus of claim 7, wherein the conveyor conveys the sheet-shaped silver halide light sensitive material in a conveying direction and the first coater and the second coater are arranged with regard to the conveying direction such that the first coater coats the first solution on the conveyed sheet-shaped silver halide light sensitive material before the second coater coats the second solution.

9. The apparatus of claim 1, wherein the coater comprises a holding member to hold the sheet-shaped silver halide light sensitive material.

10. The apparatus of claim 1, wherein a thickness of the thin layer is 2 μm to 300 μm.

11. The apparatus of claim 10, wherein a thickness of the thin layer is 5 μm to 100 μm.

12. The apparatus of claim 1, wherein the coating head comes in contact with the coating layer so as to spread the coating layer.

13. The apparatus of claim 1, further comprising:
a sensor to detect the silver halide light sensitive material on the passage before the silver halide light sensitive material arrives at the coater and to output a detection signal; and
a controller, in response to the detection signal, to control the coater to start a coating operation before the silver halide light sensitive material arrives at the coater.

14. An apparatus for processing a silver halide light sensitive material having an emulsion surface with a processing solution, comprising:
a coater to coat the emulsion surface of the sheet shaped silver halide light sensitive material with a processing solution;
a conveyor for conveying the silver halide light sensitive material along a passage to the coater;
a sensor to detect the silver halide light sensitive material on the passage before the silver halide light sensitive material arrives at the coater and to output a detection signal; and
a controller, in response to the detection signal, to control the coater to start a coating operation before the silver halide light sensitive material arrives at the coater,
wherein the coater comprises a coating head arranged substantially perpendicularly to the conveying direction of the conveyor and the coating head is provided with one of plural holes and a slit through which the silver halide light sensitive material is coated with the processing solution.

15. The apparatus of claim 14, further comprising:
a heater to heat the silver halide light sensitive material so as to raise a temperature of the emulsion surface of the silver halide light sensitive material to be 40° C. to 90° C. when the emulsion surface of the silver halide light sensitive material is coated with the processing solution.

16. The apparatus of claim 14, wherein the processing solution is one of a color developing solution and a black and white developing solution.

17. The apparatus of claim 16, wherein the processing solution is a color developing solution.

18. The apparatus of claim 16, wherein a processing time for the color developing is not more than 20 seconds.

19. The apparatus of claim 15, wherein the controller, in response to the detection signal, controls the heater to start a heating operation before the silver halide light sensitive material arrives at the coater and to raise a temperature of the emulsion surface of the silver halide light sensitive material to be 40° C. to 90° C. when the emulsion surface of the silver halide light sensitive material is coated with the processing solution.

20. The apparatus of claim 14, wherein the coater supplies the emulsion surface of the silver halide light sensitive material with the processing solution in an amount of 5 ml to 100 ml per 1 m² of the silver halide light sensitive material.

21. The apparatus of claim 14, wherein the coater comprises a roller to come in contact with the emulsion surface of the silver halide light sensitive material so that the emulsion surface of the silver halide light sensitive material is coated with the processing solution.

22. The apparatus of claim 14, wherein the coater comprises a pair of rollers and a saucer-shaped container in which one of the pair of rollers is dipped in the processing solution and a surface of the one of the pair of rollers comes in contact with the emulsion surface of the silver halide light sensitive material so that the emulsion surface of the silver halide light sensitive material is coated with the processing solution.

* * * * *